US011529586B2

(12) United States Patent
Bergstrom

(10) Patent No.: US 11,529,586 B2
(45) Date of Patent: Dec. 20, 2022

(54) ADHESIVELY-BONDED WATER SEPARATION CARTRIDGE MODULE

(71) Applicant: Natural Ocean Well Co., Culver City, CA (US)

(72) Inventor: Robert A. Bergstrom, Culver City, CA (US)

(73) Assignee: NATURAL OCEAN WELL CO., Culver City, CA (US)

(*) Notice: Subject to any disclaimer, the term of this patent is extended or adjusted under 35 U.S.C. 154(b) by 0 days.

(21) Appl. No.: 17/732,427

(22) Filed: Apr. 28, 2022

(65) Prior Publication Data

US 2022/0250006 A1 Aug. 11, 2022

Related U.S. Application Data

(63) Continuation of application No. PCT/US2020/058574, filed on Nov. 2, 2020.
(Continued)

(51) Int. Cl.
*B01D 61/08* (2006.01)
*B01D 65/00* (2006.01)
(Continued)

(52) U.S. Cl.
CPC ............ *B01D 61/08* (2013.01); *B01D 61/025* (2013.01); *B01D 61/026* (2022.08); *B01D 61/04* (2013.01);
(Continued)

(58) Field of Classification Search
CPC ...... B01D 61/08; B01D 61/025; B01D 61/04; B01D 65/003; B01D 2313/06;
(Continued)

(56) References Cited

U.S. PATENT DOCUMENTS

| 3,171,808 A | * | 3/1965 | Todd | ................ | B01D 61/08 |
| | | | | | 203/DIG. 17 |
| 3,456,802 A | * | 7/1969 | Cole | ................ | B01D 61/10 |
| | | | | | 203/DIG. 17 |

(Continued)

FOREIGN PATENT DOCUMENTS

| GB | 2068774 | | 8/1981 | | |
| GB | 2068774 A | * | 8/1981 | ............. | B01D 61/08 |

(Continued)

OTHER PUBLICATIONS

Pacenti et al., "Submarine seawater reverse osmosis desalination system", Desalination 126, pp. 213-218. (Year: 1999).*

(Continued)

*Primary Examiner* — Terry K Cecil
(74) *Attorney, Agent, or Firm* — Patterson Thuente Pedersen, P.A.

(57) ABSTRACT

A submersible water desalination apparatus includes an array of generally parallel water separation membrane cartridges each having a water separation membrane, an impermeable cartridge wall surrounding the membrane, and a product water collection tube that collects from inside the cartridges at least partially desalinated product water passing through the membrane, and through which the at least partially desalinated water exits the cartridges and enters a product water collection manifold. The cartridges are mounted in a perforated divider plate. In embodiments, a) the manifold is adhesively bonded to a plurality of the collection tubes, or b) the divider plate is adhesively bonded to a plurality of the cartridge walls or ends, or both a) and b). The adhesive reduces the likelihood of leakage at the manifold or divider plate.

30 Claims, 14 Drawing Sheets

Related U.S. Application Data

(60) Provisional application No. 62/929,564, filed on Nov. 1, 2019.

(51) Int. Cl.
| | | |
|---|---|---|
| *B01D 61/04* | (2006.01) | |
| *C02F 1/44* | (2006.01) | |
| *B01D 61/02* | (2006.01) | |
| *C02F 103/08* | (2006.01) | |
| *F04D 29/58* | (2006.01) | |
| *F03G 7/05* | (2006.01) | |
| *B01D 61/10* | (2006.01) | |
| *B01D 61/06* | (2006.01) | |

(52) U.S. Cl.
CPC ............ *B01D 61/06* (2013.01); *B01D 61/10* (2013.01); *B01D 65/003* (2013.01); *C02F 1/441* (2013.01); *F03G 7/05* (2013.01); *F04D 29/588* (2013.01); *B01D 2311/08* (2013.01); *B01D 2313/06* (2013.01); *B01D 2313/125* (2013.01); *B01D 2313/13* (2013.01); *B01D 2313/243* (2013.01); *B01D 2313/36* (2013.01); *B01D 2313/365* (2013.01); *B01D 2313/44* (2013.01); *B01D 2313/54* (2013.01); *B01D 2313/56* (2013.01); *B01D 2315/06* (2013.01); *B01D 2317/04* (2013.01); *B01D 2319/04* (2013.01); *C02F 2103/08* (2013.01); *C02F 2201/002* (2013.01); *C02F 2201/004* (2013.01); *C02F 2201/006* (2013.01); *C02F 2201/007* (2013.01); *C02F 2201/009* (2013.01); *C02F 2209/03* (2013.01); *C02F 2209/05* (2013.01); *C02F 2209/06* (2013.01); *C02F 2209/22* (2013.01); *C02F 2209/40* (2013.01); *C02F 2303/14* (2013.01)

(58) Field of Classification Search
CPC ......... B01D 2313/125; B01D 2313/44; B01D 2313/54; B01D 2315/06; B01D 2317/04; C02F 1/441; C02F 2103/08; C02F 2201/004; C02F 2201/006; C02F 2201/007; C02F 2303/14

See application file for complete search history.

(56) References Cited

U.S. PATENT DOCUMENTS

| | | | | |
|---|---|---|---|---|
| 3,928,204 | A * | 12/1975 | Thomas | B01D 63/12 210/321.83 |
| 4,125,463 | A * | 11/1978 | Chenoweth | B01D 65/02 210/636 |
| 4,296,951 | A * | 10/1981 | Zimmerly | B01D 63/12 285/915 |
| 4,334,992 | A * | 6/1982 | von Bonin | B01D 65/00 210/241 |
| 4,517,085 | A * | 5/1985 | Driscoll | B01D 29/54 210/321.83 |
| 5,192,434 | A * | 3/1993 | Moller | B01D 63/082 210/231 |
| 5,229,005 | A * | 7/1993 | Fok | B01D 61/10 210/170.11 |
| 5,366,635 | A * | 11/1994 | Watkins | C02F 1/441 210/651 |
| 5,620,605 | A * | 4/1997 | Møller | B01D 61/362 210/232 |
| 5,788,858 | A * | 8/1998 | Acernese | B01D 61/025 210/257.2 |
| 5,851,267 | A * | 12/1998 | Schwartz | B01D 65/00 96/9 |
| 5,914,041 | A * | 6/1999 | Chancellor | B01D 63/12 210/652 |
| 5,944,999 | A * | 8/1999 | Chancellor | B01D 61/08 210/170.07 |
| 5,972,216 | A * | 10/1999 | Acernese | C02F 9/005 210/259 |
| 5,980,751 | A * | 11/1999 | Chancellor | B01D 65/08 210/652 |
| 6,149,393 | A * | 11/2000 | Chancellor | F16L 9/006 417/409 |
| 6,348,148 | B1 * | 2/2002 | Bosley | B01D 61/10 210/257.2 |
| 6,565,747 | B1 * | 5/2003 | Shintani | B01D 63/10 210/493.4 |
| 8,282,823 | B2 * | 10/2012 | Acernese | B01D 61/10 210/259 |
| 8,685,252 | B2 * | 4/2014 | Vuong | B01D 61/025 210/636 |
| 9,227,159 | B2 * | 1/2016 | Dufresne | C02F 1/441 |
| 9,636,635 | B2 | 5/2017 | Benton et al. | |
| 2004/0108272 | A1 * | 6/2004 | Bosley | B01D 65/08 210/652 |
| 2008/0190849 | A1 * | 8/2008 | Vuong | B01D 61/10 210/170.11 |
| 2010/0237016 | A1 * | 9/2010 | Vuong | C02F 1/444 210/652 |
| 2010/0270236 | A1 * | 10/2010 | Scialdone | C02F 1/441 210/636 |
| 2010/0276369 | A1 * | 11/2010 | Haag | C02F 1/441 210/170.11 |
| 2011/0186513 | A1 * | 8/2011 | Vuong | B01D 61/025 210/636 |
| 2016/0185626 | A1 * | 6/2016 | Glynn | C02F 1/325 210/170.11 |
| 2018/0001263 | A1 * | 1/2018 | Johnson | B01D 61/04 |
| 2019/0091629 | A1 * | 3/2019 | Dehlsen | B63B 77/00 |

FOREIGN PATENT DOCUMENTS

| | | | |
|---|---|---|---|
| WO | WO 2000/41971 | 7/2000 | |
| WO | WO-0041971 A1 * | 7/2000 | ............ B01D 61/10 |
| WO | WO 2009/086587 | 7/2009 | |
| WO | WO-2009086587 A1 * | 7/2009 | .......... B01D 61/025 |
| WO | WO 2012/131621 | 10/2012 | |
| WO | WO 2018/148528 | 8/2018 | |
| WO | WO 2018/148542 | 8/2018 | |
| WO | WO-2018148542 A1 * | 8/2018 | .......... B01D 61/025 |

OTHER PUBLICATIONS

Pacenti et al., Submarine seawater reverse osmosis desalination system. Desalination 126, pp. 213-218, Nov. 1999.

International Preliminary Report on Patentability from PCT/US2020/058574, dated May 3, 2022, 8 pages.

* cited by examiner

ADHESIVELY-BONDED WATER SEPARATION CARTRIDGE MODULE

TECHNICAL FIELD

The present application is a continuation under 35 U.S.C. § 111(a) of International Patent Application No. PCT/US2020/058574, filed on Nov. 2, 2020, which claims priority to U.S. Provisional Patent Application No. 62/929,564, filed on Nov. 1, 2019, the disclosures of which are incorporated by reference herein.

TECHNICAL FIELD

This invention relates to water desalination.

BACKGROUND ART

The growth of saltwater (e.g., seawater) desalination has been limited by the relatively high cost of desalinated water. This high cost is due in part to energy and capital expenses associated with current desalination systems. Such systems typically employ an onshore facility containing reverse osmosis (RO) desalination membranes contained in high-pressure corrosion-resistant housings and supplied with seawater from a submerged offshore intake system. Very high pressures typically are required to drive water through the RO membranes. For example, the widely-used FILMTEC™ SW30 family of reverse osmosis membrane elements (from DuPont Water Solutions) require about an 800 psi (55 bar) pressure differential across the membrane to meet design requirements. In addition to such high pressures, onshore RO units suffer from high power demands, primarily for pressurizing the feedwater to membrane operating pressures, and for an onshore RO unit these power demands typically average about 13.5 kWh per thousand gallons of produced fresh water. The seawater and the concentrated brine stream produced by a typical onshore RO unit have high corrosion potential and consequently require expensive components and equipment, including pressure vessels and conduits made from specialized alloys. The highly-pressurized water flow also increases maintenance expenses. Onshore RO units typically also require significant amounts of expensive seaside real estate. Shore-based desalination has in addition been criticized for various environmental impacts, including entrainment of marine life in the intake water, greenhouse gas production associated with producing the energy required, discharge of a strong brine stream with the potential to harm marine life, the use of treatment chemicals that may enter the ocean, and onshore land use that is often expensive and may harm local ecosystems. RO units include those described in U.S. Pat. No. 4,334,992 (Bonin et al.), U.S. Pat. No. 5,192,434 (Moller), U.S. Pat. No. 5,620,605 (Moller et al.), U.S. Pat. No. 5,788,858 (Acernase et al. '858), U.S. Pat. No. 5,972,216 (Acernase et al. '216), U.S. Pat. No. 8,282,823 B2 (Acernase et al. '823) and U.S. Pat. No. 9,227,159 B2 (DuFresne et al.).

In the 50 years since the invention of semi-permeable RO membranes, various concepts for submerging such membranes and employing natural hydrostatic water pressure to help desalinate seawater have been proposed. Representative examples include the systems shown in U.S. Pat. No. 3,171,808 (Todd), U.S. Pat. No. 3,456,802 (Cole), U.S. Pat. No. 4,125,463 (Chenowith), U.S. Pat. No. 5,229,005 (Fok et al.), U.S. Pat. No. 5,366,635 (Watkins), U.S. Pat. No. 5,914,041 (Chancellor '041), U.S. Pat. No. 5,944,999 (Chancellor '999), U.S. Pat. No. 5,980,751 (Chancellor '751), U.S. Pat. No. 6,149,393 (Chancellor '393), U.S. Pat. No. 6,348,148 B1 (Bosley) and U.S. Pat. No. 8,685,252 B2 (Vuong et al.); US Patent Application Publication Nos. US 2008/0190849 A1 (Vuong), US 2010/0270236 A1 (Scialdone), US 2010/0276369 A1 (Haag) and US 2018/0001263 A1 (Johnson et al.); GB Patent No. 2 068 774 A (Mesple); International Application Nos. WO 00/41971 A1 (Gu), WO 2009/086587 A1 (Haag Family Trust), WO 2018/148528 A1 (Bergstrom et al.), WO 2018/148542 A1 (Bergstrom) and Pacenti et al., Submarine seawater reverse osmosis desalination system, Desalination 126, pp. 213-18 (November, 1999).

Other water desalination technologies have also been proposed, including systems employing microfiltration, nanofiltration, ultrafiltration and aquaporins. These likewise have various drawbacks. In general, submerged water desalination systems do not appear to have been placed in widespread use, due in part to factors such as the energy cost of pumping the desalinated water to the surface from great depth and the difficulty of maintaining component parts at depth.

In onshore RO systems, RO membrane cartridges are normally arranged in series, using a plug to seal the inlet end of the first permeate tube in the series, tubular interconnectors to join the permeate collector tubes of successive individual cartridges, and an end connector to join the last permeate tube in the series to a product water connection manifold. The plug, interconnectors and end connector normally are equipped with one or more O-rings. These and other exemplary plugs, interconnectors and end connectors are shown in U.S. Pat. No. 3,928,204 (Thomas), U.S. Pat. No. 4,296,951 (Zimmerly), U.S. Pat. No. 4,517,085 (Driscoll et al.) and U.S. Pat. No. 5,851,267 (Schwartz).

From the foregoing, it will be appreciated that what remains needed in the art is an improved system for water desalination featuring one or more of lower energy cost, lower capital cost, lower operating or maintenance cost or reduced environmental impact. Such systems are disclosed and claimed herein.

SUMMARY

Compared to land-based water separation, a submerged water separation system can provide several important advantages. For example, submerged operation can significantly reduce pump power requirements, since hydrostatic pressure can provide much or all of the driving force required for desalination, and only desalinated water will need to be pumped onshore. However, repair or replacement of component parts can be difficult, especially when the system is submerged at significant depths, and may require shutting down an entire submerged system or in some cases bringing it to the surface so that repair or replacement can be carried out. Accordingly, it is important to minimize or eliminate potential points of system failure.

In a submerged system employing RO cartridges, parallel rather than serial cartridge arrangements may be employed, as discussed for example in the above-mentioned Johnson et al. and Bergstrom et al applications. In a purely parallel arrangement, interconnectors are not needed, but end plugs and end connectors normally will be required. O-rings may be employed for such plugs and end connectors, but may also lead to system leakage and failure. Such failure may arise for example due to "compression set" (loss of resiliency) that may be experienced by O-rings and other rubber-based seals following prolonged exposure to low temperatures while in a compressed state.

In addition, a parallel RO cartridge arrangement can employ a perforated divider plate for mounting the cartridges and separating the high pressure inlet side of the submerged system from the lower pressure product water side of the system. O-rings may be used to seal the cartridges to the divider plate, but again may lead to system leakage and failure.

The disclosed invention provides in one aspect a submersible water separation membrane module comprising:
  a plurality of water separation membrane cartridges having:
    i) a water separation membrane,
    ii) an impermeable cartridge wall surrounding the membrane,
    iii) a first cartridge end sealed to the wall and through which pressurized salinated water flows into the cartridge and is separated by the membrane into concentrate or brine and at least partially desalinated water,
    iv) a second cartridge end from which the concentrate or brine exits the cartridge, and
    v) a product water collection tube that collects from inside the cartridge the at least partially desalinated product water passing through the membrane, and through which the at least partially desalinated water exits the cartridge;
  a generally parallel array of the cartridges being mounted in a perforated divider plate whose perforations surround the cartridge walls or the first or second cartridge ends, the divider plate separating salinated water flowing into the first cartridge ends from concentrate or brine exiting the cartridges; and
  a product water collection manifold in fluid engagement with a plurality of the product water collection tubes and into which the at least partially desalinated water flows;
wherein a) the manifold is adhesively bonded to a plurality of the collection tubes, or b) the divider plate is adhesively bonded to a plurality of the cartridge walls or ends, or both a) and b).

The disclosed invention provides in another aspect a method for assembling a submersible water desalination apparatus, the method comprising the steps of:
  a. providing a plurality of water separation membrane cartridges having:
    i) a water separation membrane,
    ii) an impermeable cartridge wall surrounding the membrane,
    iii) a first cartridge end sealed to the wall and through which pressurized salinated water flows into the cartridge and is separated by the membrane into concentrate or brine and at least partially desalinated water,
    iv) a second cartridge end from which the concentrate or brine exits the cartridge, and
    v) a product water collection tube that collects from inside the cartridge the at least partially desalinated product water passing through the membrane, and through which the at least partially desalinated water exits the cartridge;
  b. mounting a generally parallel array of the cartridges in a perforated divider plate whose perforations surround the cartridge walls or the first or second cartridge ends, the divider plate separating salinated water flowing into the first cartridge ends from concentrate or brine exiting the cartridges; and
  c. fastening a product water collection manifold in fluid engagement with a plurality of the product water collection tubes;
wherein a) the manifold is adhesively bonded to a plurality of the collection tubes, b) the divider plate is adhesively bonded to a plurality of the cartridge walls or ends, or both a) and b).

The disclosed apparatus provides a submerged "Natural Ocean Well" that can provide desalinated water at reduced cost and with improved reliability compared to land-based RO systems, and with improved RO membrane maintenance and replacement compared to existing submerged reverse osmosis (SRO) systems, and especially when replacement is accomplished using a remotely operated vehicle (ROV).

BRIEF DESCRIPTION OF THE DRAWING

Like reference symbols in the various figures of the drawings indicate like elements. The elements in the drawings are not to scale.

DETAILED DESCRIPTION

Figure 1:
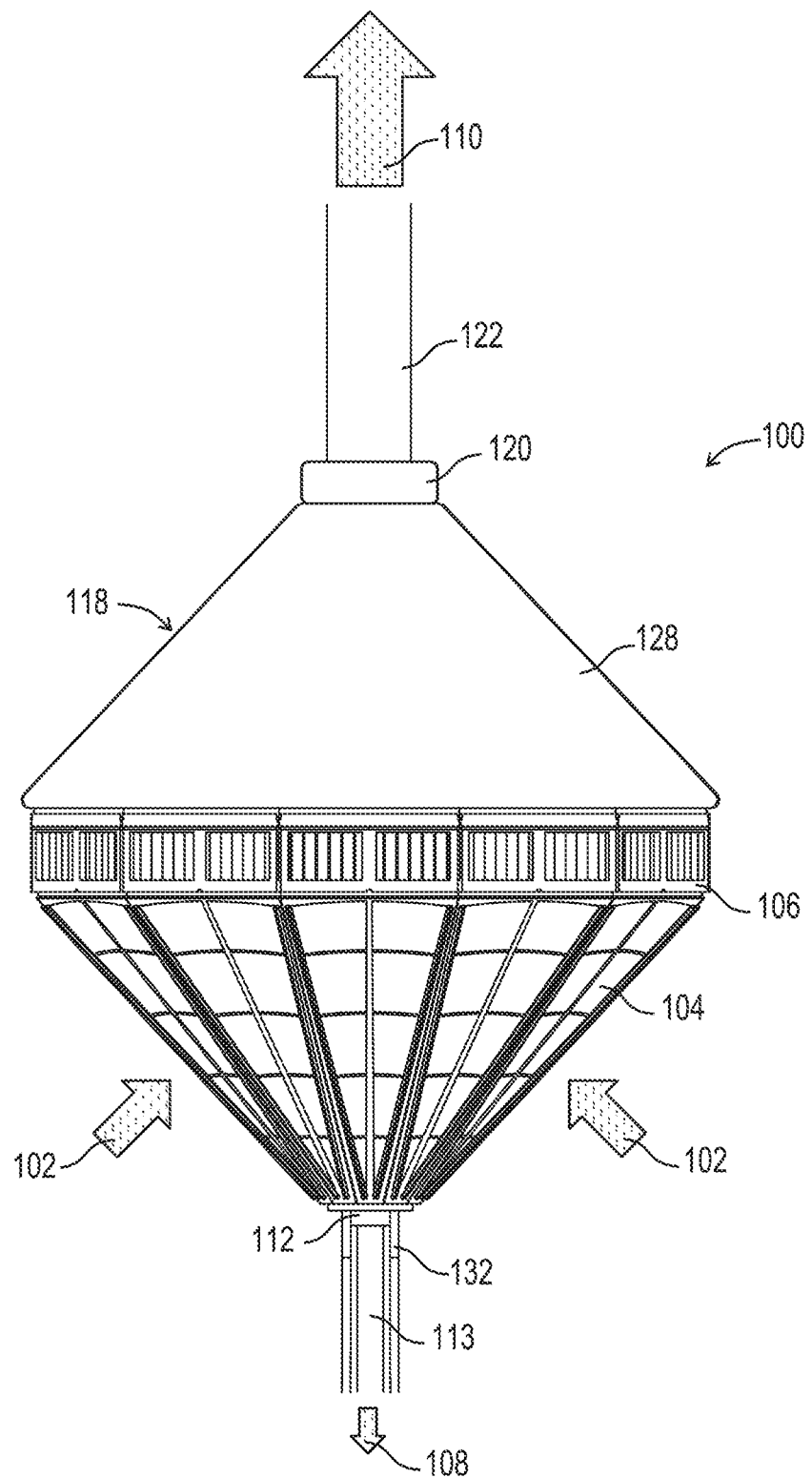
FIG. 1 and FIG. 2 are schematic side views of one embodiment of the disclosed apparatus.

The recitation of a numerical range using endpoints includes all numbers subsumed within that range (e.g., 1 to 5 includes 1, 1.5, 2, 2.75, 3, 3.80, 4, 5, etc.).

The terms "a," "an," "the," "at least one," and "one or more" are used interchangeably. Thus, for example, an apparatus that contains "a" reverse osmosis membrane includes "one or more" such membranes.

The term "brine" refers to an aqueous solution containing a materially greater sodium chloride concentration than that found in typical saltwater, viz., salinity corresponding to greater than about 3.5% sodium chloride. It should be noted that different jurisdictions may apply differing definitions for the term "brine" or may set different limitations on saline discharges. For example, under current California regulations, discharges should not exceed a daily maximum of 2.0 parts per thousand (ppt) above natural background salinity measured no further than 100 meters horizontally from the discharge point. In other jurisdictions, salinity limits may for example be set at levels such as 1 ppt above ambient, 5% above ambient, or 40 ppt absolute.

The term "concentrate" refers to an RO apparatus discharge stream having an elevated salinity level compared to ambient surrounding seawater, but not necessarily containing sufficient salinity to qualify as brine in the applicable jurisdiction where such stream is produced.

The term "conduit" refers to a pipe or other hollow structure (e.g., a bore, channel, duct, hose, line, opening, passage, riser, tube or wellbore) through which a liquid flows during operation of an apparatus employing such conduit. A conduit may be but need not be circular in cross-section, and may for example have other cross-sectional shapes including oval or other round or rounded shapes, triangular, square, rectangular or other regular or irregular shapes. A conduit also may be but need not be linear or uniform along its length, and may for example have other shapes including tapered, coiled or branched (e.g., branches radiating outwardly from a central hub).

The term "depth" when used with respect to a submerged water desalination apparatus or a component thereof refers to the vertical distance, viz., to the height of a water column, from the free surface of a body of water in which the apparatus or component is submerged to the point of seawater introduction into the apparatus or to the location of the component.

The terms "desalinated water", "fresh water" and "product water" refer to water containing less than 1000 parts per million (ppm), and more preferably less than 500 ppm, dissolved inorganic salts by weight. Exemplary such salts include sodium chloride, magnesium sulfate, potassium nitrate, and sodium bicarbonate.

The term "recovery ratio" when used with respect to an SRO system or SRO apparatus means the volumetric ratio of product water (permeate) produced by the system or apparatus to feedwater introduced to the system or apparatus.

The terms "remotely operated vehicle" and "ROV" refer to unoccupied submersible vehicles capable of underwater maneuvering and manipulation of submerged objects.

The terms "saltwater" and "seawater" refer to water containing more than 0.5 ppt dissolved inorganic salts by weight, and thus encompassing both brackish water (water containing 0.5 to 3.0 ppt dissolved organic salts by weight) as well as water containing more than 3.0 ppt dissolved organic salts by weight. In oceans, dissolved inorganic salts typically are measured based on Total Dissolved Solids (TDS), and typically average about 35,000 parts per million (ppm) TDS, though local conditions may result in higher or lower levels of salinity.

The term "submerged" means underwater.

The term "submersible" means suitable for use and primarily used while submerged.

In the discussion that follows, emphasis will be placed on the use of RO membranes in a submerged RO (SRO) apparatus for carrying out water separation, it being understood that persons having ordinary skill in the art will after reading this disclosure be able to replace the disclosed RO membranes with other types of water separation membranes. Exemplary such other water separation membranes include those based on microfiltration, nanofiltration and ultrafiltration; aquaporins; and other water separation technologies that are now known or hereafter developed and which will be familiar to persons having ordinary skill in the art.

Figure 2:
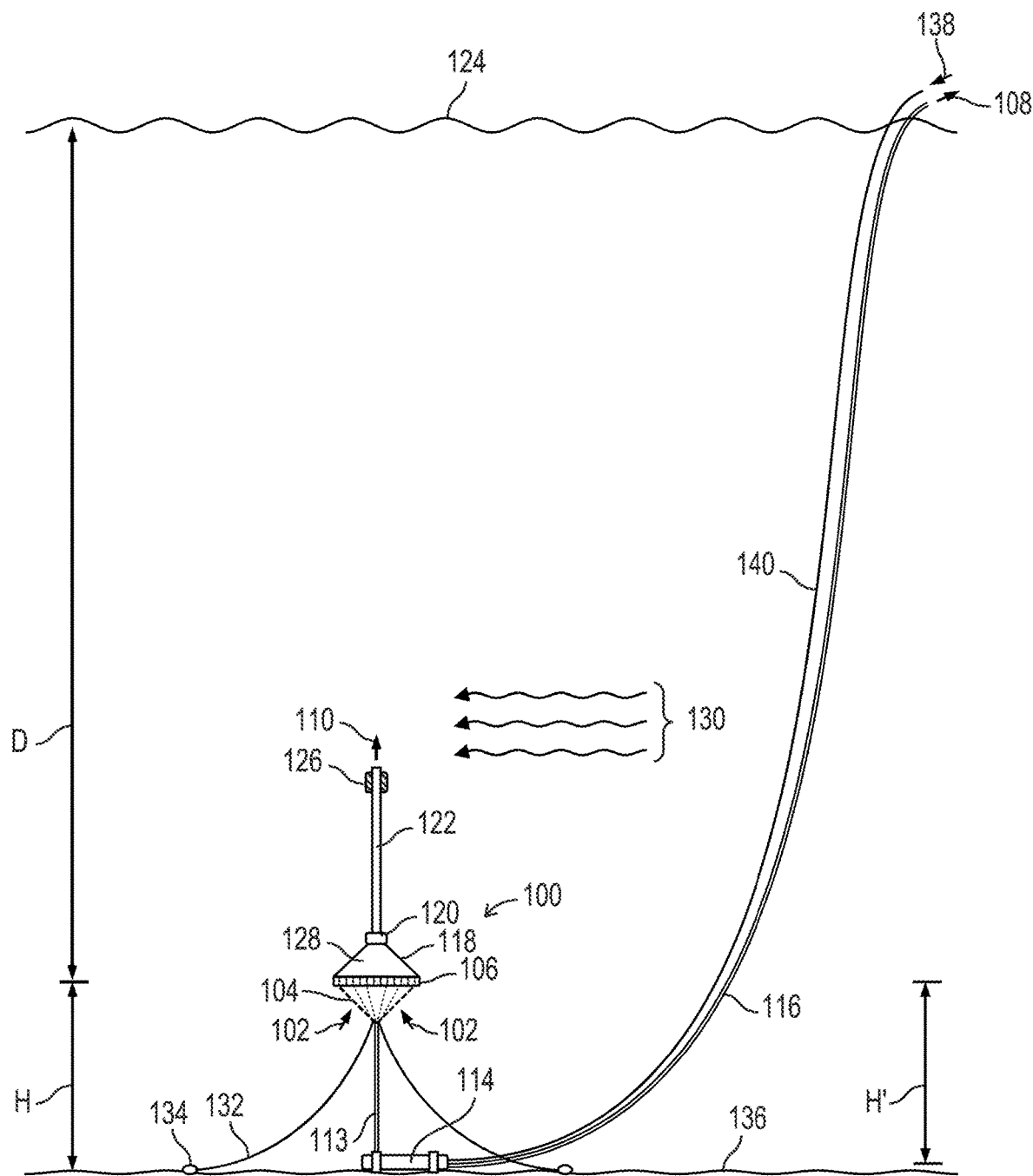

Referring first to FIG. 1 and FIG. 2, SRO apparatus 100 is shown in schematic side view. Raw seawater 102 enters apparatus 100 via prefilter screens 104, and is separated by RO membrane modules 106 into product water permeate stream 108 and concentrate or brine discharge stream 110. Permeate stream 108 passes into permeate collector 112 and thence through permeate conduit 113, submerged pump 114 and delivery conduit 116 to a ship-borne or onshore collection point (not shown in FIG. 1 or FIG. 2) for post-treatment, conveyance or storage for later use. Such uses may include municipal, private or industrial purposes including potable water, bathing water, irrigation water, process water, water storage, water table replenishment, cooling or heat exchange, and a variety of other purposes that will be apparent to persons having ordinary skill in the art. For example, potential cooling or heat exchange applications for such product water include providing or improving the efficiency of air conditioning systems including Sea Water Air Conditioning (SWAC) systems; operating or improving the efficiency of Ocean Thermal Energy Conversion (OTEC) systems (in addition to those discussed herein); and operating or improving the efficiency of Rankine Cycle heat engines (again, in addition to those discussed herein).

Figure 3:
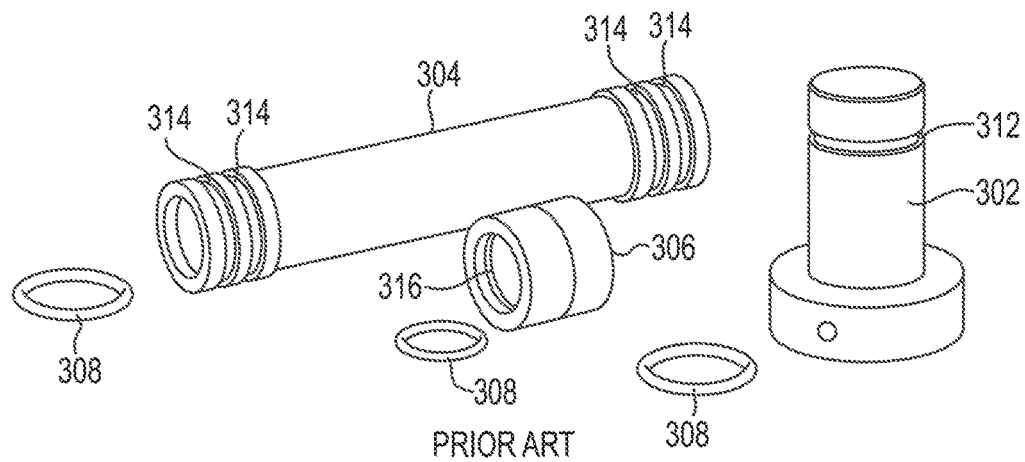
FIG. 3 is a perspective view of conventional plug, interconnector and end connector devices for use with permeate collector tubes in conventional RO water separation cartridges.

FIG. 3 shows a conventional plug 302, interconnector 304, end connector 306 and O-rings 308 for use with permeate collector tubes in conventional RO water separation cartridges. Components 302, 304 and 306 are typically made from a moldable thermoplastic such as NORYL™ resin or acrylonitrile-butadiene-styrene (ABS) copolymer, O-Rings 308 are typically made from ethyl propyl rubber (EPR) or a fluoroelastomer. O-rings 308 normally reside in the grooves 312, 314 and 316 in components 302, 304 and 306.

Figure 4:
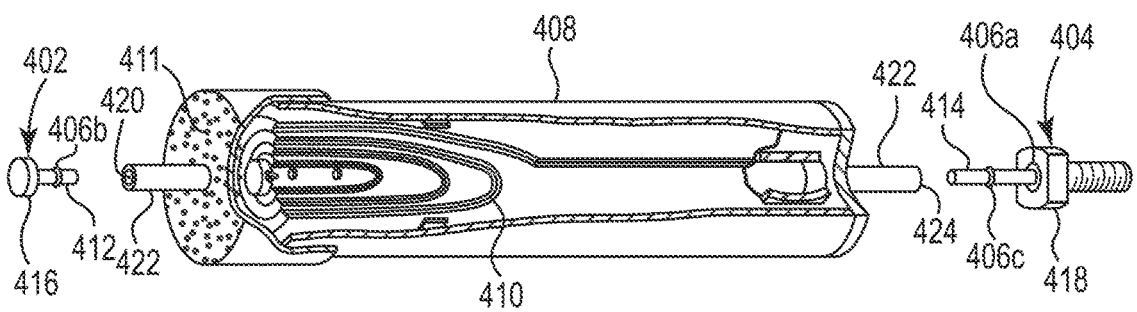
FIG. 4 is a perspective view, partially cut away, of an end plug and end connector that employ adhesive bonding to prevent leakage at connections to the permeate collection tube of a water separation cartridge.

FIG. 4 shows an end plug 402 and end connector 404 that can be attached to RO cartridge 408 for use in the present invention. Cartridge 408 is shown in partial cutaway view to depict the manner in which spiral-wound membrane 410 surrounds permeate tube 422. Salinated water enters cartridge 408 at its left-hand end (as depicted in FIG. 4) via inlet orifices 411. Product water exits cartridge 408 at its right-hand end (as depicted in FIG. 4) via permeate tube 422, and concentrate or brine exits cartridge 408 via openings (not shown in FIG. 4) at the same right-hand end of cartridge 408. End plug 402 and end connector 404 each include one or more beads of uncured adhesive 406, respectively arranged along the length of reduced diameter tubular portions 412 and 414. In one embodiment, adhesive 406 includes a fillet (not visible in FIG. 4) positioned at the junction between reduced diameter portion 412 and increased diameter portion 416 of end plug 402. In another embodiment, adhesive 406 includes a fillet 406a positioned at the junction between reduced diameter portion 414 and increased diameter portion 418 of end connector 404. Adhesive 406 may also be disposed as a bead of adhesive such as beads 406b and 406c on reduced diameter portions 412 and 414. In one embodiment, beads 406b or 406c may be disposed in one or more suitable adhesive recesses (e.g., grooves) in portions 412 and 414. In another embodiment (not shown in FIG. 4), adhesive 406 is disposed as a thin film on reduced diameter portions 412 or 414. Prior to the cure of adhesive 406, end plug 402 and end connector 404 are respectively inserted into inlet end 420 and outlet end 424 of permeate tube 422 and adhesive 406 is allowed or caused to cure or otherwise harden. In an additional embodiment, one or both of end plug 402 and end connector 404 may be enlarged and reshaped to fit over rather than inside the ends of tube 422, and the adhesive beads (and recesses, if used) or adhesive thin films may be relocated as needed to fit in the gap between end plug 402 and end connector 404 and their corresponding mating surfaces on permeate tube 422. Following the cure of adhesive 406, end plug 402 and end connector 404 desirably provide a leakproof seal at each end of permeate tube 422. Although adhesives have previously been used to assemble other parts of RO membrane cartridges, for example to fasten separation membranes to permeate collection tubes, adhesives do not appear to have been used to interconnect cartridges or to connect water collection manifolds to cartridges. Doing so could make it much more difficult to replace used cartridges in conventional serially-arranged cartridge arrays.

Figure 5:
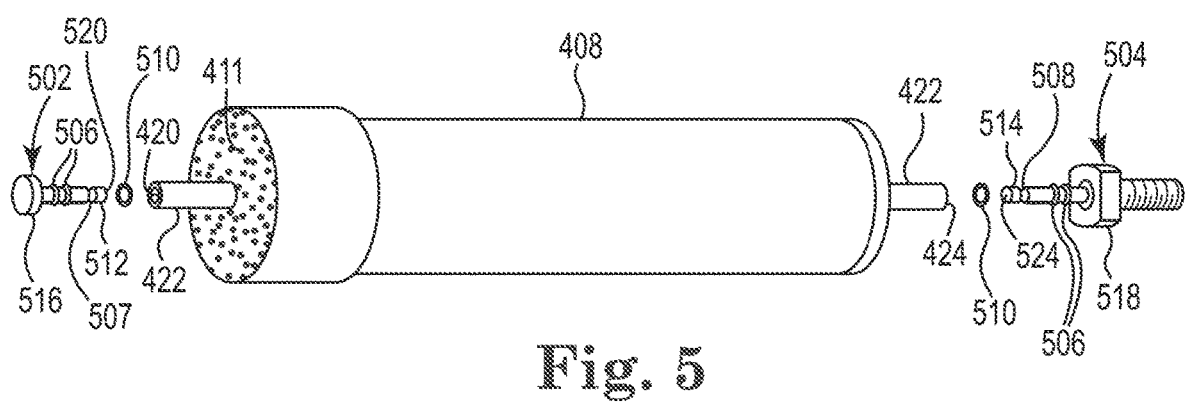
FIG. 5 is a perspective view of another end plug and end connector that employs both adhesive bonding and 0-rings to help prevent leakage at connections to the permeate collection tube of a water separation cartridge.

FIG. 5 shows an end plug 502 and end connector 504 which are similar to plug 402 and connector 404, but which each employ two beads of uncured adhesive 506 and also employ O-ring grooves 507 and 508 which house O-rings 510. As is the case for adhesive 406 on plug 402 and connector 404, adhesive 506 on plug 502 and connector 504 may be in the form of a fillet positioned at the junction between reduced diameter portion 512 and increased diameter portion 516 or at the junction between reduced diameter portion 514 and increased diameter portion 518 of end connector 504, or may be disposed in one or more suitable adhesive recesses (e.g., grooves) in portions 512 and 514, or may be disposed as a thin film on reduced diameter portions 512 or 514. Prior to the cure of adhesive 506, O-rings 510 are installed in grooves 507 and 508, and end plug 502 and end connector 504 are respectively inserted into inlet end 420 and outlet end 424 of permeate tube 422. In an alternative embodiment, one or both of end plug 502 and end connector 504 may be enlarged and reshaped to fit over rather than inside the ends of tube 422, and the adhesive beads (and recesses, if used) or adhesive thin films and the O-rings are relocated as need be to fit in the gap between end plug 502 and end connector 504 and their corresponding mating surfaces on permeate tube 422. Adhesive 506 and O-rings 510 desirably provide a leakproof seal at each end of permeate tube 422 in RO membrane cartridge 408. Seal durability can be facilitated by using O-rings 510 made from cold temperature resistant elastomeric materials such as silicone rubber or ethylene propylene diene monomer (EPDM). When applying adhesive 506 to components (such as components 502 and 504) that will contact one or more O-rings 510, it is important that the adhesive not contact any O-rings or O-ring grooves before or after component assembly, as the hardened adhesive might prevent the O-ring from functioning correctly. Accordingly, it is preferred to locate adhesive 506 and any associated adhesive recesses on end plug 502 so that the O-rings 510 will slide into tube 422 before adhesive 506 contacts tube 422. For similar reasons it is preferred to locate adhesive 506 and any associated adhesive recesses on end connector 504 so that the O-rings 510 will slide into tube 422 before adhesive 506 contacts tube 422. For embodiments in which plug 502 or connector 504 fit over rather than inside the ends of tube 422, similar care may be needed when locating and placing adhesive 506 to avoid contact with and contamination of the O-rings 510 or grooves 507 and 508 during assembly. In any event, the adhesive and O-rings should be sufficiently spatially separated from one another so as to discourage such contamination.

If desired, the disclosed adhesive may be used with other sealing or fastening technologies to fasten the product water collection tubes to the manifolds. Such other technologies include threaded connections, bayonet connections and GRALOC™ connectors from Oceaneering. By combining the adhesive with such other technologies, overall connection reliability may be improved and the likelihood of a connection failure may be reduced. In such instances it may not be necessary to spatially separate the adhesive from such other sealing or fastening technology. For example, an adhesive may readily be used in a threaded or bayonet connection and if desired later be debonded using mechanisms discussed in more detail below.

In the disclosed apparatus, raw seawater, product water and concentrate or brine may each flow in a variety of directions, e.g., upwardly, downwardly, horizontally, obliquely or any combination thereof. In the embodiment shown in FIG. 2, reverse osmosis membranes within membrane modules 106 are oriented so that concentrate or brine 110—is discharged generally upwardly from the modules 106 and is captured and collected by hood 118. Further details regarding such modules may be found in copending International Application No. PCT/US2020/058569, filed on Nov. 2, 2020 and entitled SUBMERGED WATER DESALINATION SYSTEM WITH REPLACEABLE DOCKABLE MEMBRANE MODULES, the disclosure of which is incorporated herein by reference. Axial pump 120 located at the lower end of riser 122 sends captured concentrate or brine 110 through riser 122 toward surface 124, for further use or dispersal.

In the embodiment shown in FIG. 2, concentrate or brine 110 exits riser 122, whereupon dispersion and dilution takes place in the surrounding seawater. In an additional embodiment (not shown in FIG. 2), concentrate or brine 110 is transported through a further conduit to undergo dispersal (and preferably wide area dispersal) at a significant distance (e.g., at least 50, at least 100, at least 200, at least 300, at least 400 or at least 500 meters) away from apparatus 100, or into a sustained underwater current 130, to be swept away from apparatus 100. In a further embodiment (also not shown in FIG. 2), concentrate or brine 110 is transported through a further conduit for an even greater distance (e.g., all the way to or nearly to surface 124) for further use or dispersal. If desired, the concentrate or brine may instead be discharged in another direction such as downwardly or horizontally, while preferably still undergoing wide area dispersal well away from apparatus 100.

The concentrate or brine may be used for a variety of purposes prior to discharge. In one embodiment, the concentrate or brine has desirable volumetric and thermal utility that may be used to operate an OTEC system and provide operating or surplus power, as discussed in copending International Application No. PCT/US2020/058567, filed on Nov. 2, 2020 and entitled OCEAN THERMAL ENERGY CONVERSION SUBMERGED REVERSE OSMOSIS DESALINATION SYSTEM, the disclosure of which is incorporated herein by reference.

In the embodiment shown in FIG. 2, buoyancy provided by a ring float 126 and a foam layer, e.g., an engineered syntactic foam layer (not shown in FIG. 2) located beneath the surface of hood 128, help maintain apparatus 100 at an appropriate depth D below surface 124. Catenary mooring lines 132 affixed to anchors 134 in seabed 136 help maintain apparatus 100 at an appropriate depth D below surface 124, an appropriate height H above seabed 136, and an appropriate height H' above the inlet to pump 114. Depth D preferably is such that the hydrostatic pressure of seawater at depth D is sufficient to drive seawater 102 through membrane modules 106 and produce product water 108 and concentrate or brine 110 at a desired overall volume and recovery ratio without the need for additional pumps or other measures to pressurize seawater 102 on the inlet side of membrane modules 106.

The depth of the disclosed apparatus 100, height H' and the diameter of the inlet to pump 114 are desirably sized to provide at least the net positive suction head (NPSH) or greater pressure (viz., the pressure caused by the height of the standing column of product water 108 in permeate conduit 113 and permeate collector 112 between membrane modules 106 and the inlet side of pump 114) sufficient to avoid inlet side cavitation upon startup and operation of pump 114. Further details regarding such cavitation avoidance during startup and operation may be found in copending International Application No. PCT/US2020/058573, filed on Nov. 2, 2020 and entitled SUBMERGED WATER DESALINATION SYSTEM WITH REMOTE PUMP, the disclosure of which is incorporated herein by reference.

In some embodiments, pump 114 includes one or more sensors, controls or a torque limiting coupling (e.g., a magnetic clutch, hydraulic torque converter, combination thereof or other such device) between the electrical motor powering the pump and the pump impeller so as to limit or avoid inlet side cavitation and accompanying stress or other disturbance of the RO membranes during pump operation. Further details regarding cavitation avoidance during such operation are discussed in copending International Application No. PCT/US2020/058570, filed on Nov. 2, 2020 and entitled SUBMERGED WATER DESALINATION SYSTEM WITH PRODUCT WATER PUMP CAVITATION PROTECTION, the disclosure of which is incorporated herein by reference.

In one embodiment, pump 114 diverts at least a portion of the product water 108 for use as a lubricating or cooling fluid directed through one or more of the pump, pump motor or the coupling between the motor and pump. Doing so can improve the pump longevity, while avoiding the need to use seawater, hydraulic fluid or other potentially corrosive or toxic fluids for lubrication or cooling. Further details regarding the use of product water for such lubrication and cooling are discussed in copending International Application No. PCT/US2020/058572, filed on Nov. 2, 2020 and entitled SUBMERGED WATER DESALINATION SYSTEM PUMP LUBRICATED WITH PRODUCT WATER, the disclosure of which is incorporated herein by reference.

Electrical power and appropriate control signals 138 may be supplied to pump 114 and other components of apparatus 100 through multi-conductor cable 140. The supplied electrical power operates pumps 114 and 120 as needed other components in apparatus 100, such as a prefilter cleaning brush system. Further details regarding a desirable prefilter cleaning brush embodiment are discussed in more detail in the above-mentioned copending International Application No. PCT/US2020/058569, filed on Nov. 2, 2020.

When operated at sufficient depth, the RO membranes in apparatus 100 will not need to be encased in pressure vessels, and may instead be mounted in a perforated divider plate made from relatively inexpensive and suitably corrosion-resistant materials such as a corrosion-resistant metal, a suitable plastic, a fiber-reinforced (e.g., glass fiber- or carbon fiber-reinforced) plastic or other composite, or a variety of other unreinforced or engineered plastics the selection of which will be understood by persons having ordinary skill in the art. The disclosed adhesive bonding of the water separation cartridges to the divider plate can significantly strengthen the rigidity and overall strength of the disclosed modules 106. Also, avoiding the need for a pressure vessel greatly reduces the required capital expenditure (CAPEX) for constructing apparatus 100 compared to the costs for constructing a shore-based RO unit. If the RO membranes are individual units (for example, cartridges containing spiral-wound membranes), then avoidance of a pressure vessel also enables modules 106 to be economically designed using a parallel array containing a significantly larger number of cartridges than might normally be employed in a shore-based RO unit, and operating the individual cartridges at a lower than normal individual throughput. For example, the number of cartridges may be at least 10% more, at least 15% more, at least 20% more or at least 25% more than might normally be employed in an onshore RO unit. Doing so can help extend the life of individual membrane cartridges while still providing a desired daily amount of product water. In the embodiment shown in FIG. 1 and FIG. 2, and as discussed in more detail below, modules 106 preferably contain a large array of parallel cylindrical RO cartridges operated not only at such low individual throughput, but also with a reduced recovery rate. Doing so can also provide reduced concentrate salinity, reduced fouling potential, and in preferred embodiments will result in a large volume of concentrate that does not qualify as brine in the applicable jurisdiction, and which has substantial cold thermal energy potential for cooling an OTEC system. For example, permeate stream 108 is depicted in FIG. 1 as having a substantially smaller volume than brine discharge stream 110, corresponding to a low recovery ratio. Exemplary recovery ratios may for example be no greater than 40%, no greater than 30%, no greater than 20%, no greater than 15%, no greater than 10%, no greater than 8% or no greater than 6%, and may for example be less than 3%, at least 3%, at least 4% or at least 5%. The chosen recovery ratio will depend upon factors including the selected RO membranes, and the depth and applicable jurisdiction in which the SRO apparatus operates. The chosen recovery ratio also influences pump sizing and energy costs. By way of example, for an SRO embodiment employing Dow FILMTEC membrane cartridges to treat seawater with an average 34,000 ppm salinity at an 8% recovery ratio, about 8% of the seawater inlet stream will be converted to product water having less than 500 ppm salinity, and about 92% of the seawater inlet stream will be converted to a low pressure or unpressurized brine stream having about 37,000 ppm salinity. By way of a further example, an SRO apparatus employing Nitto Hydranautics membrane cartridges operated at a depth of about 500 m and a 5% recovery ratio may be used to produce concentrate that does not qualify as brine under the current version of the California Water Quality Control Plan.

In one preferred embodiment, the disclosed SRO apparatus operates at a depth of at least about 425 m, does not employ seawater pumps on the RO membrane inlet side, and employs a product (fresh) water pump on the outlet side of the RO membranes to maintain at least a 50 Bar pressure drop across the membranes and pull product water through such membranes. Advantages for such a configuration include a pump requiring much less energy when operated at the membrane outlet rather than at the inlet, and the avoidance of, or much lower requirements for, any pressure vessels housing the membranes. Use of membranes with a low required pressure differential will enable operation at lesser depths or using smaller pumps. Currently preferred such membranes include Nitto Hydranautics SWC6-LD membranes (40 bar differential pressure) and LG Chem LG-SW-400-ES membranes (38 bar differential pressure).

Figure 6:
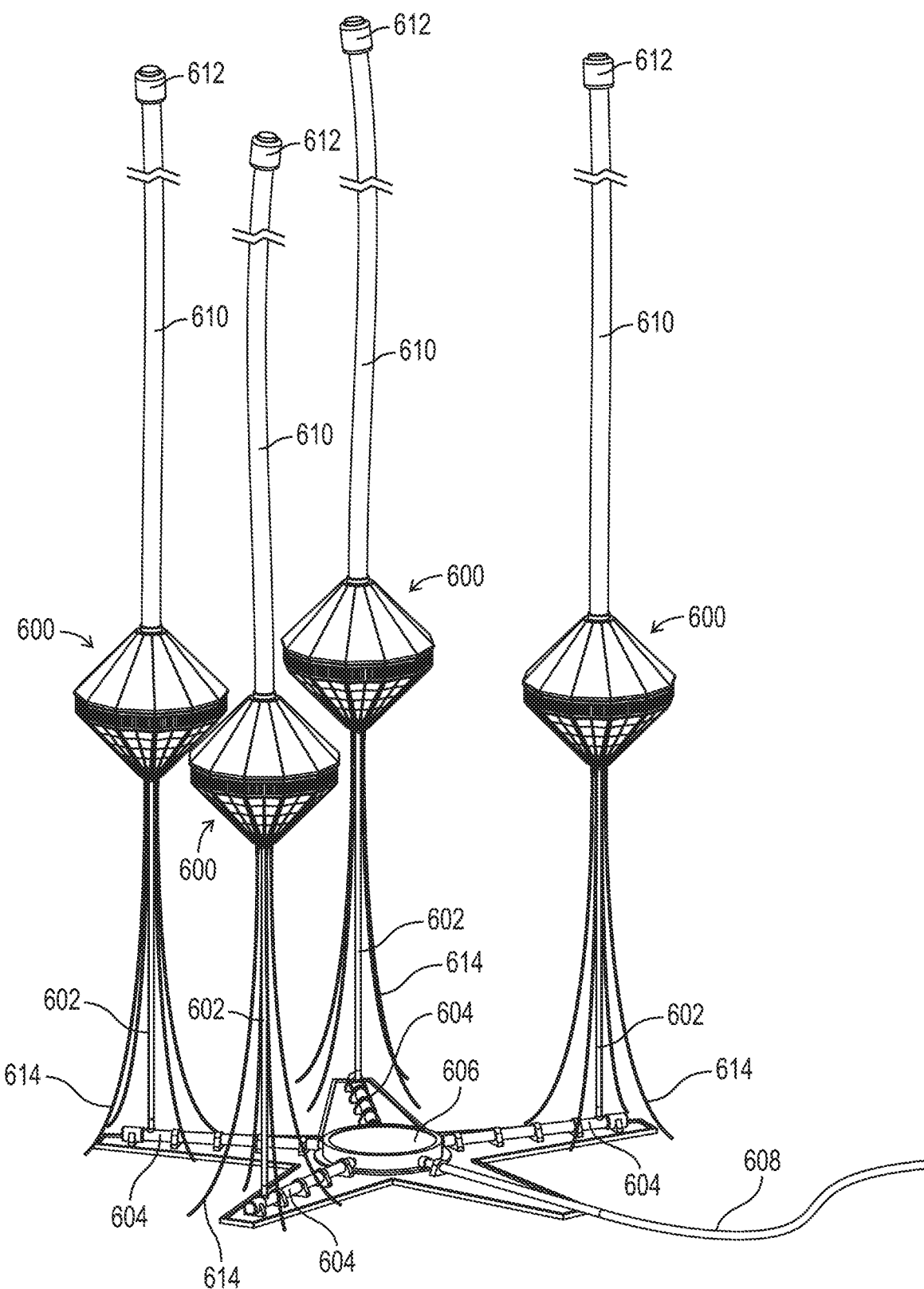
FIG. 6 is a perspective view of a water farm formed by a connected array of the disclosed water desalination systems.

Referring to FIG. 6, a "water farm" containing an array of portable offshore desalination systems ("pods") 600 is shown in perspective view. Product water flows downwardly from the modules 600 through conduits 602 and horizontally through pumps 604 to a centrally located hub 606, and is then pumped towards the surface through delivery conduit 608. Concentrate or brine is pumped upwardly through conduits 610 into ocean currents for dispersal away from the pods 600 or for use in an OTEC system like that discussed above. The conduits 610 may if desired be kept separate from one another, bundled together, or connected to a single larger diameter conduit, and may if desired by equipped with hot-swap water connectors (not shown in FIG. 6) to facilitate disconnection, maintenance or replacement of individual pods 600.

As depicted in FIG. 6, four pods 600 are employed. However, lesser or greater numbers of pods can be used if desired, for example 2, 3, 5, 6, 7, 8, 10, 20 or more pods. Using a plurality of connected pods provides redundancy and enables ready scaleup of the disclosed SRO apparatus to meet initial or growing water needs. Operation and maintenance of the disclosed apparatus can be facilitated by providing a plurality of hot-swap water connectors (not shown in FIG. 6) between each conduit 602 and its associated pump 604, or between each pump 604 and hub 606, or at both the inlet and outlet ends of each pump 604. Scaleup of the disclosed apparatus can be facilitated by providing one or more additional hot-swap water connectors (not shown in FIG. 6) on hub 606 or at another convenient location to enable connection of additional pods or water farm arrays to delivery conduit 608 at a later date. If for example the individual pods 600 shown in FIG. 6 each have a 5 million gallons per day product water capacity, and if five additional hot-swap connectors are included in hub 606, then the FIG. 6 water farm could provide 20 million gallons of product water per day as initially installed, and up to five additional similarly-sized pods 600 could be added in 5 million gallons per day increments to provide up to 45 million total gallons of product water per day. In another embodiment, a plurality of such arrays may be installed near one another to provide multiple instances of the 20 million gallon per day array shown in FIG. 6, thereby providing increased capacity, redundancy and multiplicity of scale for the individual components. In yet another embodiment, the pods are not grouped together as depicted in FIG. 6, and instead are spaced apart across the seafloor, for example to accommodate topographical changes in the seafloor landscape, mooring line locations or other subsea features.

Figure 7A:
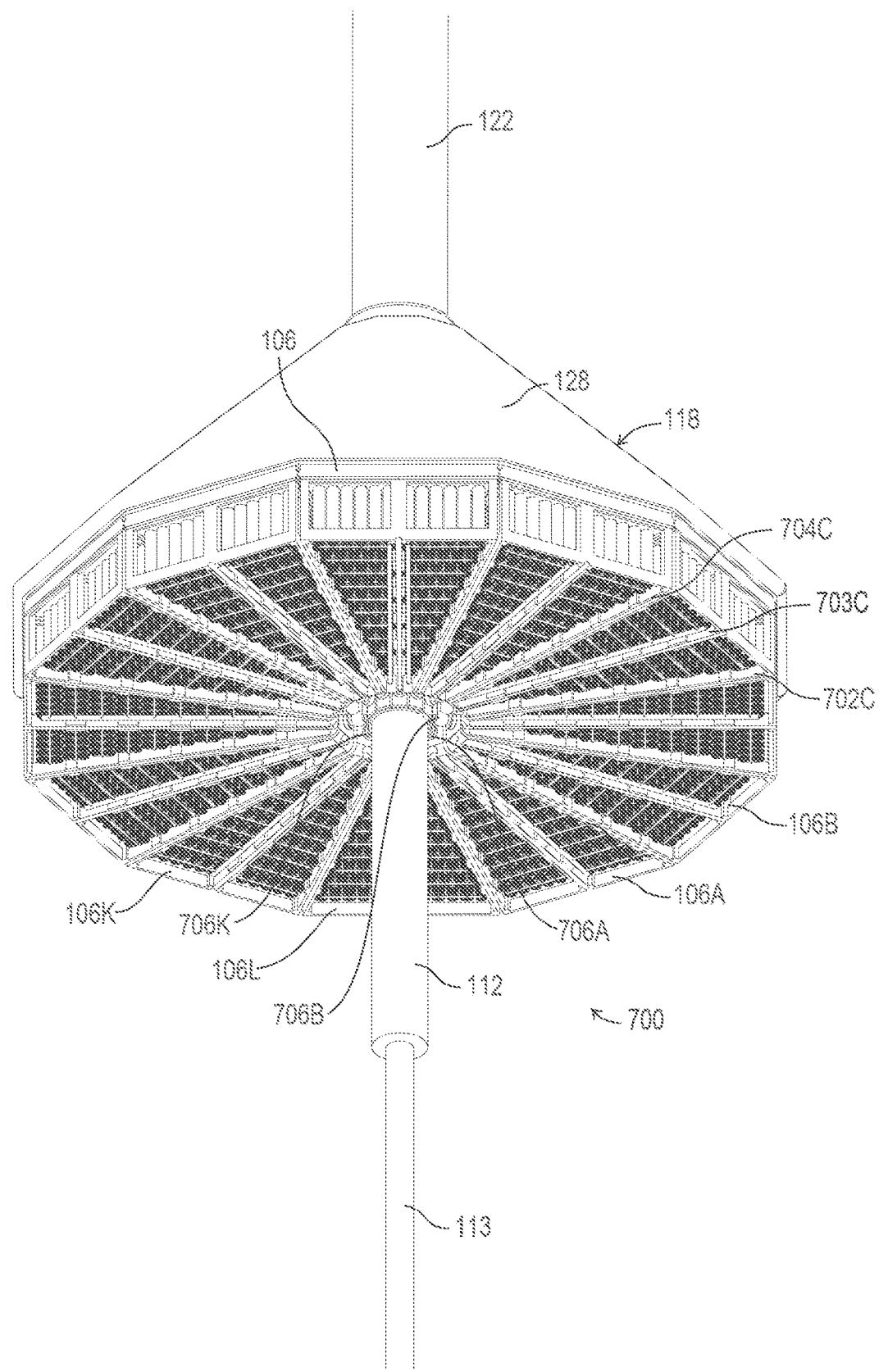
FIG. 7A, FIG. 7B and FIG. 7C are three perspective underside views of the disclosed apparatus with and without certain components.

FIG. 7A shows a perspective underside view of a polygonal array 700 of the disclosed submerged RO membrane modules 106 mounted beneath hood 118, with prefilter system 104 being removed and with four of the twelve modules 106 in the polygonal (viz., dodecagonal) array 700 being numbered in FIG. 7A (as modules 106A, 106B, 106K and 106L) and the remaining eight modules being unnumbered. Modules 106 have generally tapered module sides that converge towards centrally-located product water (viz., permeate) collector 112 and product water collection conduit 113. Modules 106 are in fluid communication with collector 112 and conduit 113 via hot-swap product water valves 706 mounted on collector 112, with three of the twelve valves connected to array 700 and conduit 113 being numbered in FIG. 7A (as valves 706A, 706B and 706K) and the remaining nine valves being unnumbered. Converging sides (two of which are numbered as side 702C and side 704C) on each module 106 assist in underwater docking and reattachment of a detached module 106 to a hot-swap product water valve 706. Central rails on modules 106 (one of which is numbered as rail 703C) provide further support for the modules 106. When the modules 106 are in operation, product water flows downwardly through permeate collector 112 and permeate conduit 113 and is carried away by a pump such as pump 114 in FIG. 2.

The disclosed hot-swap product water valves and associated components may utilize a variety of designs, including so-called "hot stab" check valves and receptacles like those used in undersea oil and gas equipment for handling hydraulic fluids. Suitable such valves and receptacles are available from a variety of suppliers including Blue Logic, FES Subsea Engineering Products, James Fisher Offshore, Oceaneering and Total Marine Technology and Unitech. By way of example, the M5 ROV Flyable Full Bore Connector from Oceaneering represents one useful such hot stab valve and receptacle combination. Because hot stab devices are typically designed for use in the undersea oil and gas industries and must tolerate the handling of hydrogen sulfide and other corrosive ingredients at significant pressures, they can be derated and their designs can be simplified and made less expensive when used to handle the noncorrosive or less corrosive fluids and much lower pressures present in the disclosed SRO apparatus.

Figure 7B:
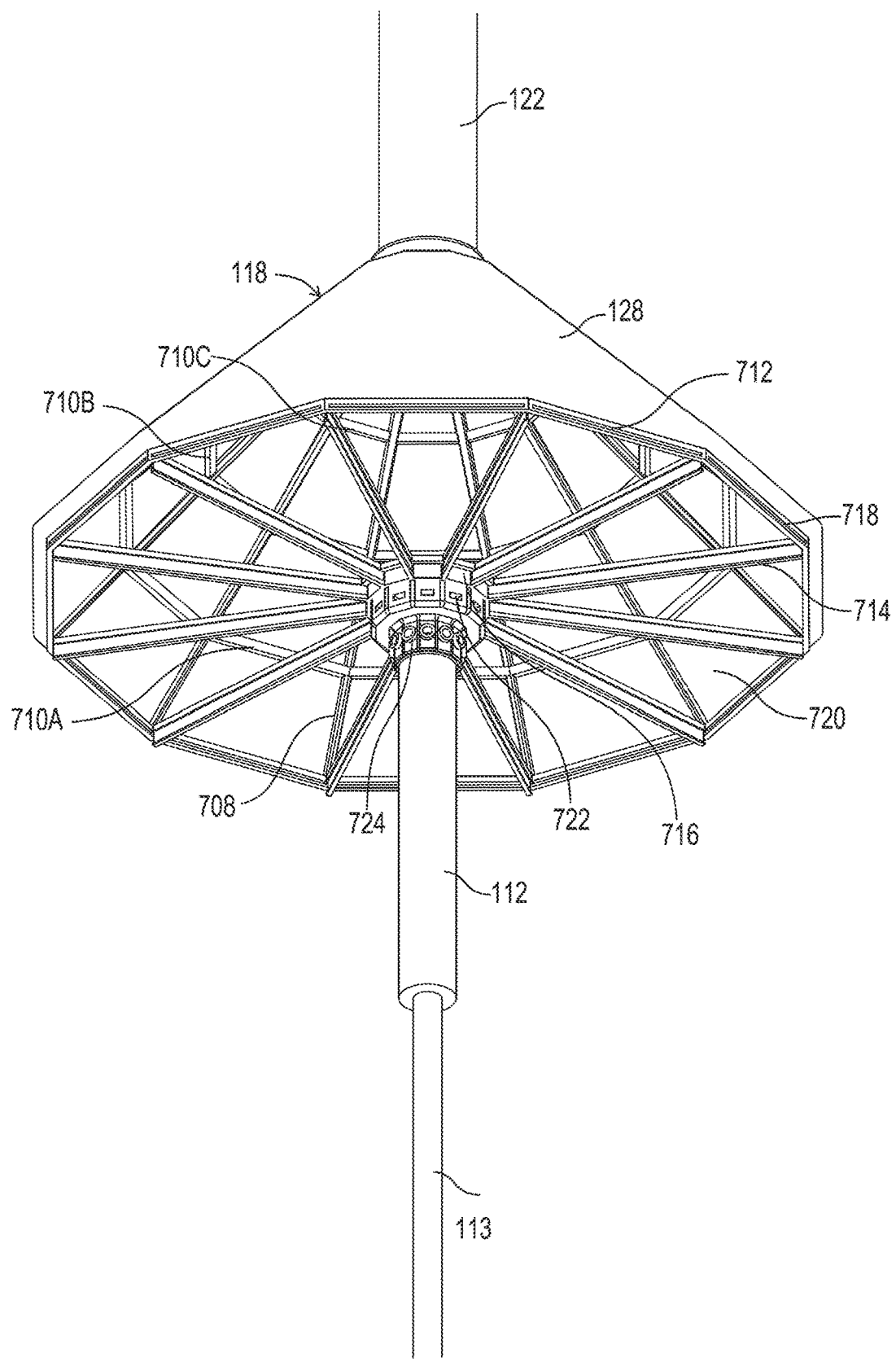

FIG. 7B shows a perspective underside view of the disclosed SRO apparatus of FIG. 7A without array 700 and its modules 106. Hood 118 includes a supporting framework formed by inclined struts 708, crossbars 710A, 710B and 710C, lower circumferential rim supports 712, lower radial rails 714, lower inner anchoring ring 716 and an upper inner anchoring ring located (but not shown in FIG. 7B) at the junction of hood 118 and riser 122. The disclosed framework preferably also receives, captures and supports the disclosed modules and array. Each circumferential rim support 712 includes a slotted receiving aperture 718 that captures hangers atop each module 106, and which are discussed in more detail below. The disclosed framework supports an overlying hood cover 128 that may for example be made from an insulated or uninsulated seawater-resistant textile, plastic or metal covering material. In a preferred embodiment, the inner side 720 of hood cover 128 is made for example from a buoyancy-imparting material such as an engineered syntactic foam. Hood cover 128 preferably provides a protective cover that helps maintain a slight pressure differential (e.g., up to 50 psi or thereabouts) between the internal concentrate or brine collected by the hood and the external environment, while isolating the interior of the hood from penetrants. Indentations 722 and product water valve couplings 724 may be seen near the top of conduit 113, just below ring 716. Rails 714, apertures 718 and indentations 722 help guide, support and locate modules 106 when array 700 is installed, and couplings 724 assist in the hot-swap attachment and detachment of modules 106. If desired, corrosion resistant magnets or electromagnets may be used to guide, retain or both guide and retain modules 106 in place within array 700 and apparatus 100.

Figure 7C:
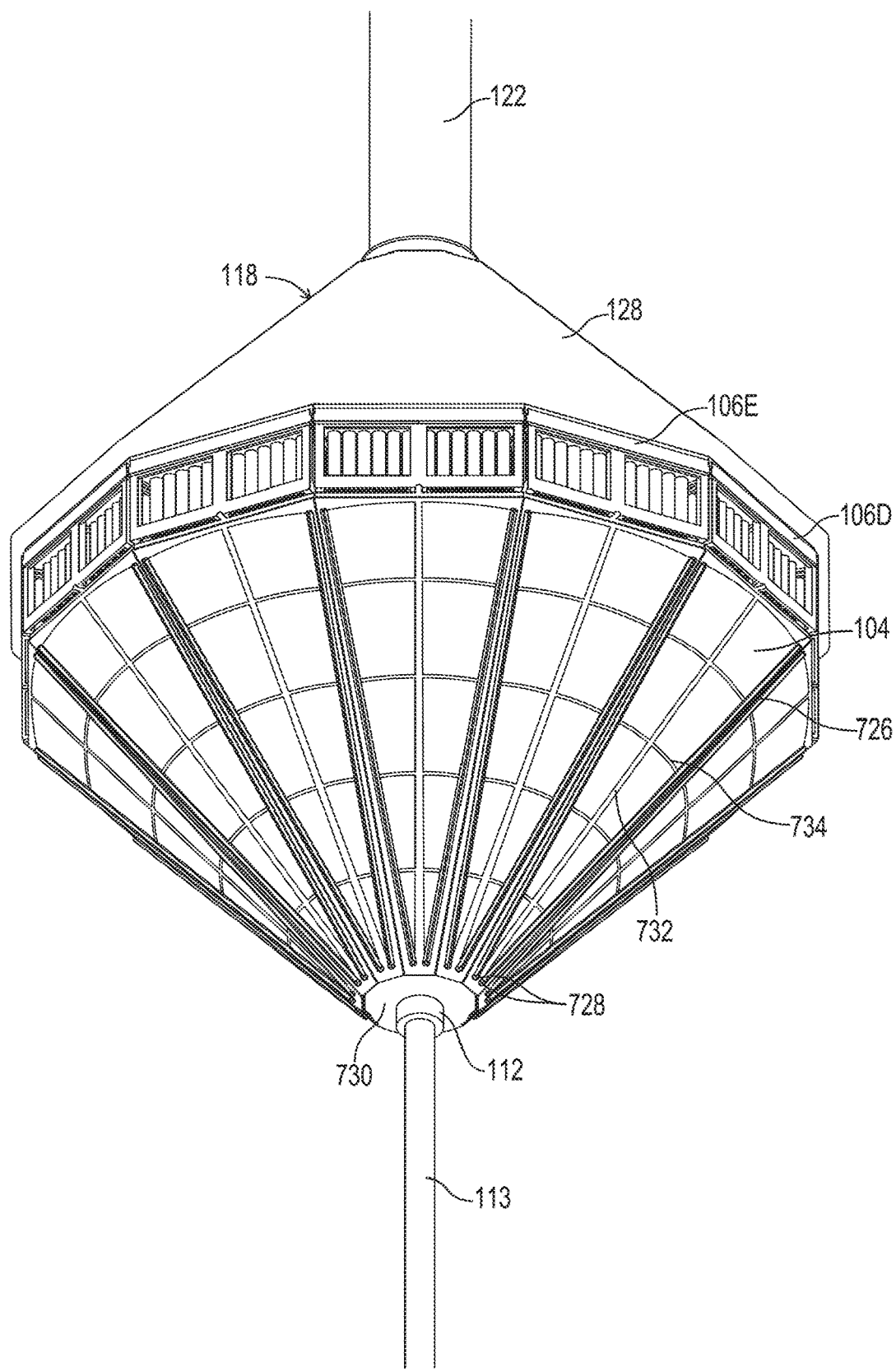

FIG. 7C shows a perspective underside view of the disclosed SRO apparatus of FIG. 7A with prefilters 104 installed. In the embodiment shown in FIG. 7C, each prefilter 104 has a generally triangular shape, and is periodically swept clean of debris by oscillating brush arms 726 mounted on pivot points 728 near lower mounting ring 730. Brush arms 726 repeatedly (e.g., intermittently, periodically or continuously, and based on predetermined times, signals from one or more sensors, or an externally-supplied control signal) sweep across the inlet face of each prefilter 104 toward central struts 732 and then stop, return to the positions shown in FIG. 7C, or initiate another sweep movement. Crossbars 734 help reinforce and support each prefilter 104 and can serve as guide rails supporting brush arms 726. In another embodiment, the assembled prefilters may have curved surfaces, a generally conical overall shape, and brush arms configured to sweep over or to revolve around the prefilters.

Figure 8A:
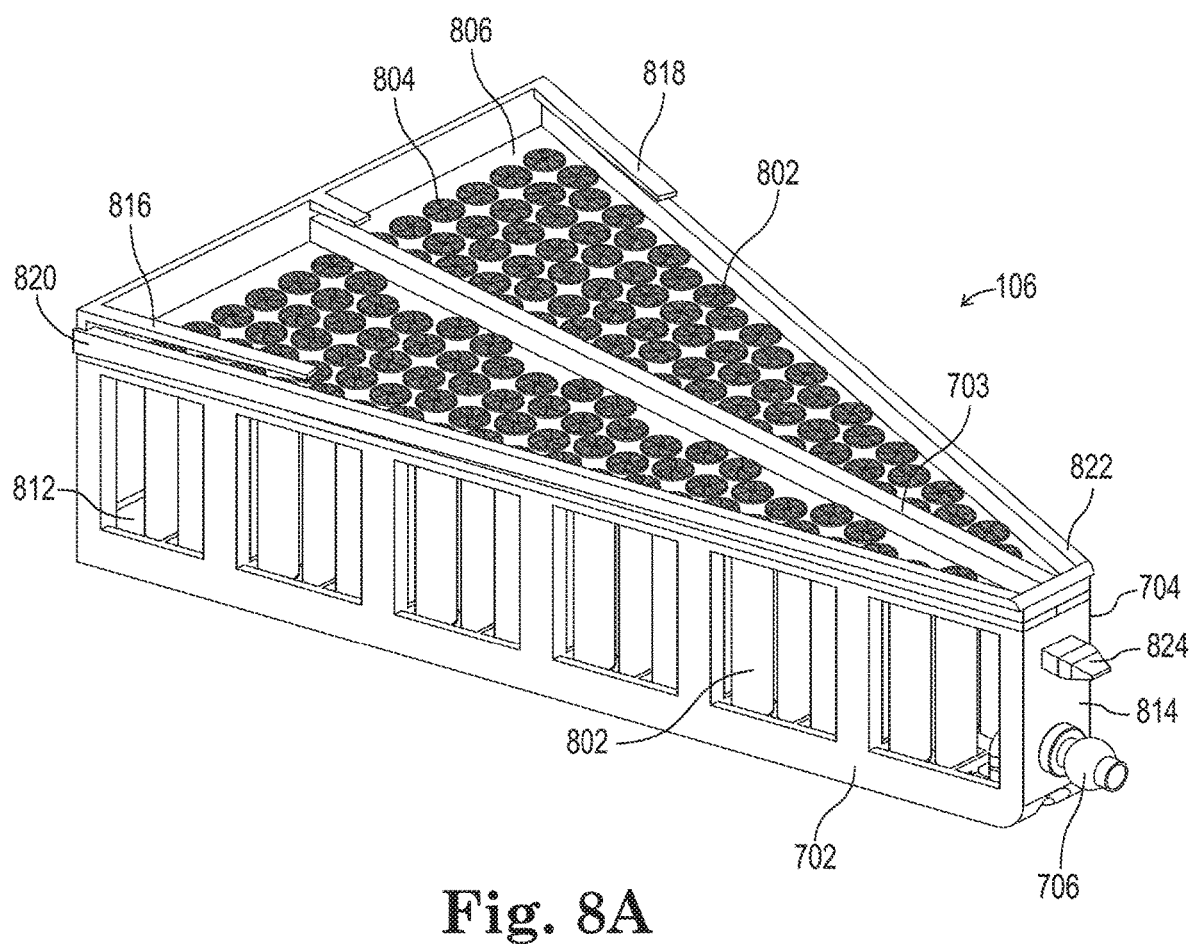
FIGS. 8A through 8E are perspective topside or underside views, from several observation angles, of an individual hot-swappable water separation membrane module.
Figure 8B:
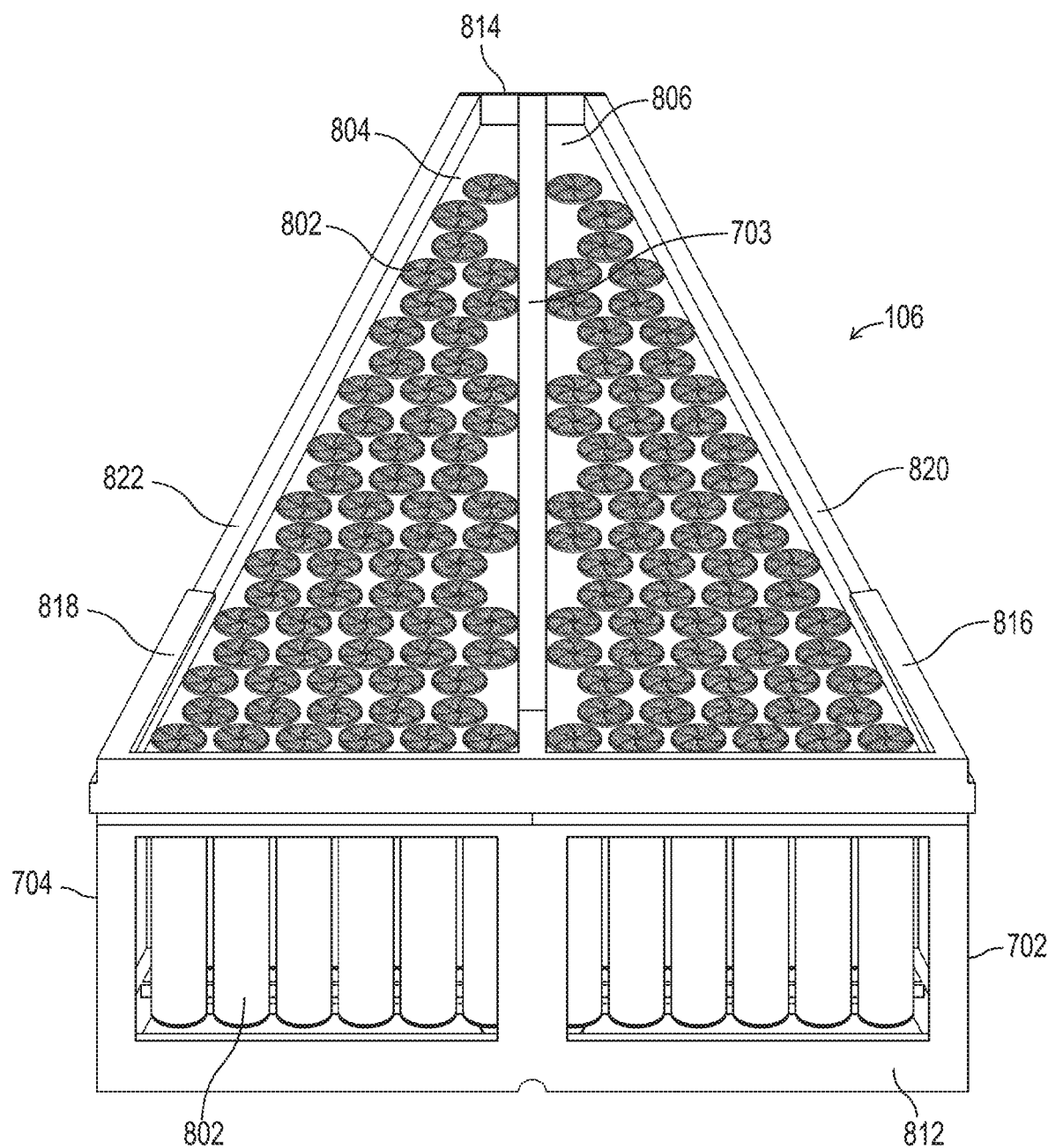

FIG. 8A and FIG. 8B are perspective topside views of a module 106 showing a plurality of RO membrane cartridges 802 suspended and sealed in apertures 804 in perforated, generally triangular divider plate 806. As depicted, cartridges 802 are generally cylindrical but may have other shapes if desired. As also depicted, module 106 contains 142 cartridges, but other greater or lesser numbers of cartridges may be employed in each module as desired, for example at least 40, at least 50, at least 60, at least 70, at least 80, at least 90 or at least 100 cartridges, and up to 200, up to 190, up to 180, up to 170, up to 160 or up to 150 cartridges. Also, as depicted all the cartridges are generally parallel and in a single layer occupying a single plane, as doing so promotes efficient flow through the disclosed apparatus. However, if desired the cartridges in a module need not be generally parallel to one another, and also if desired multiple layers of cartridges could be employed in a module.

Using 140 of the above-mentioned Hydranautics cartridges in each module, the disclosed SRO apparatus may produce about 5 million gallons per day from a twelve such modules operated at a 5% recovery rate. Other RO membrane suppliers whose cartridges may be used will be apparent to persons having ordinary skill in the art, and include Aquatech International, Axeon Water Technologies, DuPont Water Solutions (makers of the above-mentioned DOW FILMTEC cartridges), Evoqua Water Technologies, GE Water and Process Technologies, Koch Membrane Systems, Inc. and LG Chem. Customized cartridges having altered features (for example, wider gaps between layers, modified spacers, a looser membrane roll, a modified housing or modified ends) may be employed if desired.

As depicted, the cartridges 802 are substantially vertically aligned when module 106 is installed in array 700 and in use, with the concentrate or brine end outlets 804 in each cartridge 802 facing upwardly towards hood 118 and with the product water outlets (discussed below in connection with FIG. 8C) facing downwardly. However, other orientations and accompanying flow directions may be employed, for example with the outlets 804 facing downwardly, horizontally or obliquely, and with the product water outlets facing upwardly, horizontally or obliquely.

The cartridges 802 are preferably mounted in the disclosed modules 106 by adhesively bonding and sealing the cartridges in holes in perforated divider plate 806. In the embodiment depicted in FIG. 8A and FIG. 8B, the adhesive bond may be at the upper end of the cartridges 802 near the concentrate or brine outlets 804. However, as depicted in FIG. 8G, more than one divider plate 806 may be employed, and the divider plate(s) and the adhesive 840 that bonds and seals the cartridges 802 into the perforations 842 in divider plate 806 may be located at either or both ends or anywhere along the length of the cartridges 802. FIG. 8G also illustrates the use of adhesive 840 to bond manifold 828 to permeate outlet 827 as discussed above. To provide greater buoyancy (and desirably neutral buoyancy at the intended operating depth) and as shown in FIG. 8F, the spaces between cartridges 802 are desirably filled or at least partially filled with a suitable buoyant medium 850 having a density less than that of seawater. A preferred such medium is engineered syntactic foam, available from suppliers including Engineered Syntactic Systems. Medium 850 may be provided in the form of shaped blocks that may be inserted into the modules 106 before or after the installation of the cartridges 802, as a premolded perforated slab that is inserted into the modules 106 before installation of the cartridges 802, or as an in-situ cured material that may be placed in spaces between the cartridges (e.g., by spraying or other form of injection) after the cartridges have been added to the modules 106. In an embodiment, beads of adhesive 840 may be omitted and medium 850 can instead serve as the adhesive that bonds and seals the cartridges 802 into the perforations 842 in divider plate 806. Use of medium 850 can significantly assist the underwater removal and installation of the modules 106, by reducing the cantilever effect of the mass of each module 106 as it is being removed from or flown into position in the disclosed array, and especially when such removal and installation are conducted using an ROV that grips the outer edge of a module 106. The disclosed adhesive may if desired be used to fasten together any of the other components in the disclosed modules.

Perforated divider plate 806 may have a variety of shapes, for example a generally polygonal perimeter such as generally triangular perimeter or a generally trapezoidal perimeter. Plate 806 and the remaining components in module 106 that support and envelop (viz., provide a frame for) the cartridges 802 may be made from a variety of materials, including corrosion-resistant metals such as stainless steel or titanium, fiber-reinforced polymers or filled composites. Preferably a mixture of such materials is employed, with lower density components being used in appropriate locations to reduce the overall module weight, and higher strength or higher durability materials being used in other appropriate locations within the module where such strength or durability may be required. Divider plate 806, the product water collection tubes and manifold (and if desired any or all of the remaining adhesively-bonded components in module 106) may if desired be surface-treated to increase the associated surface area in locations that may require improved adhesion by the disclosed adhesive, as well as to discourage or resist biofouling.

A variety of adhesives may be used to bond and seal the cartridges in the modules. Exemplary adhesives include the above-mentioned engineered syntactic foams, as well as epoxy, polyurethane, polyester, acrylic, silicone and fluorinated resins. In one preferred embodiment, the adhesive is substantially free or completely free of bisphenol A, bisphenol F and their diglycidyl ethers. In another preferred embodiment, there are no gaskets, O-rings or other preformed seals between the cartridges and the divider plate and the adhesive is primarily or exclusively relied upon to hold the cartridges 802 in the modules 106. Suitable adhesives will include those classified as marine adhesives or sealants suitable for use below the waterline, and are available from a variety of suppliers including Dow Chemical Company, Loctite, Sika and 3M. In an especially preferred embodiment, the cartridges are adhesively bonded in the disclosed divider plate but are not encased in a pressure vessel. The disclosed adhesive may also be combined with other sealing or fastening technologies to fasten or seal the cartridges in the disclosed modules, including technologies such as gaskets, O-rings and threaded or bayonet connections.

When a module 106 is removed from the disclosed array for replacement of one or more of the cartridges 802, it may in some instances be desirable to remove and replace only certain of the cartridges, and in other instances it will be most economical to remove and replace all of them. Removal typically will require debonding the affected adhesive joints so that the associated cartridges 802 may be extracted from divider plate 806. Depending on the chosen adhesive, debonding may be performed using a variety of techniques. Exemplary techniques include mechanical force to break the adhesive bond, grinding or other abrasive techniques to remove bound portions of the module, chemical debonding (e.g., using solvents, hydrolysis, or other measures), cryogenic debonding (e.g., using liquid nitrogen or other cold source to embrittle and facilitate fracture of the adhesive), electrical debonding (e.g., using current from an arc welder or other power supply to heat a conductive filler in the adhesive) or thermal debonding (e.g., using a flame or other heat source) and thereby fracture, remove, dissolve, soften, melt, or otherwise eliminate, weaken or degrade the adhesive or its bond to the cartridges and divider plate. Once the adhesive bond has been sufficiently eliminated, weakened or degraded, the cartridges may be pushed, pulled, twisted or a combination thereof to remove them from the module.

Use of the disclosed adhesive provides a number of advantages. Water separation membrane cartridges are normally sealed to other components in a water desalination apparatus using gaskets or O-rings. Gaskets and O-rings represent a potential array leakage point, especially if the gasket or O-ring undergoes significant compression set upon exposure to cold underwater temperatures. Adhesively bonding the membrane cartridges to a perforated divider plate eliminates this potential leakage point while meanwhile increasing the beam strength and rigidity of the assembled module.

Referring again to FIG. 7B and FIG. 8A, the lower edges of hood 118 preferably overlap with, have a gasketed connection to, or are otherwise sealingly engaged with the upper edges of the modules 106, thereby isolating the collected concentrate or brine from the salinated water surrounding module 100. Divider plate 806 is desirably fastened and sealed about its periphery to converging side plates 702 and 704, outer end plate 812 and inner end plate 814, thereby further isolating the collected concentrate or brine from the surrounding salinated water.

Figure 8C:
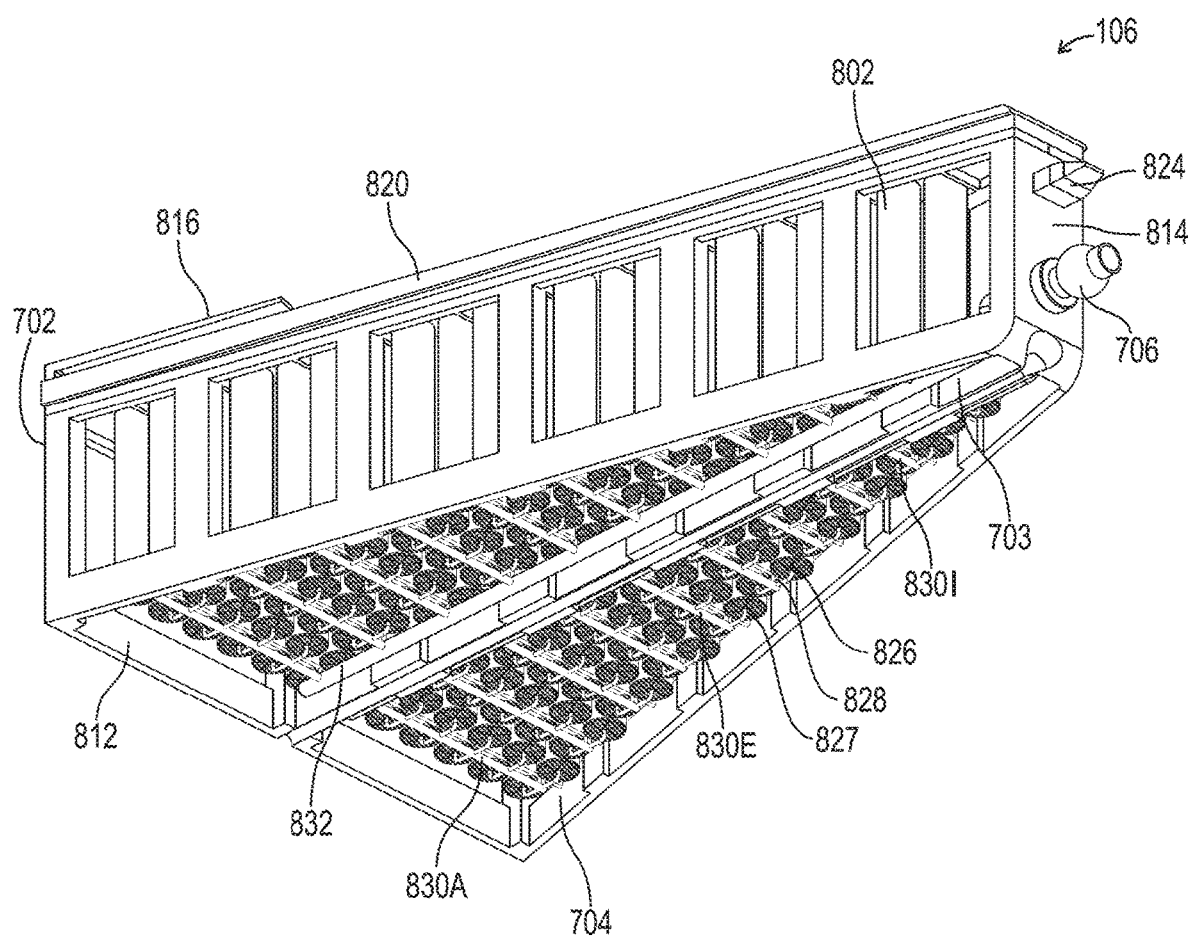

As depicted in FIG. 8A through FIG. 8C, suspending hooks 816 and 818 are fastened atop and near the outer edge of module 106, and point toward the inner edge of module 106. Hooks 816 and 818 mate with slotted receiving aperture 718 shown in FIG. 7B and help support and guide module 106 into a proper position when module 106 is pushed into an available open space in array 700. Guide rails 820 and 822 engage radial rails 714 beneath hood 118 during insertion of a module 106 into array 700. Generally wedge-shaped projecting tang 824 also helps to guide and properly affix module 106 into place in array 700, and helps ensure proper connection of hot-swappable product water valve 706 to permeate collector 112. Upon the completion of such connection, hot-swap valve 706 opens to permit the flow of product water into permeate collector 112 and permeate conduit 113.

Figure 8D:
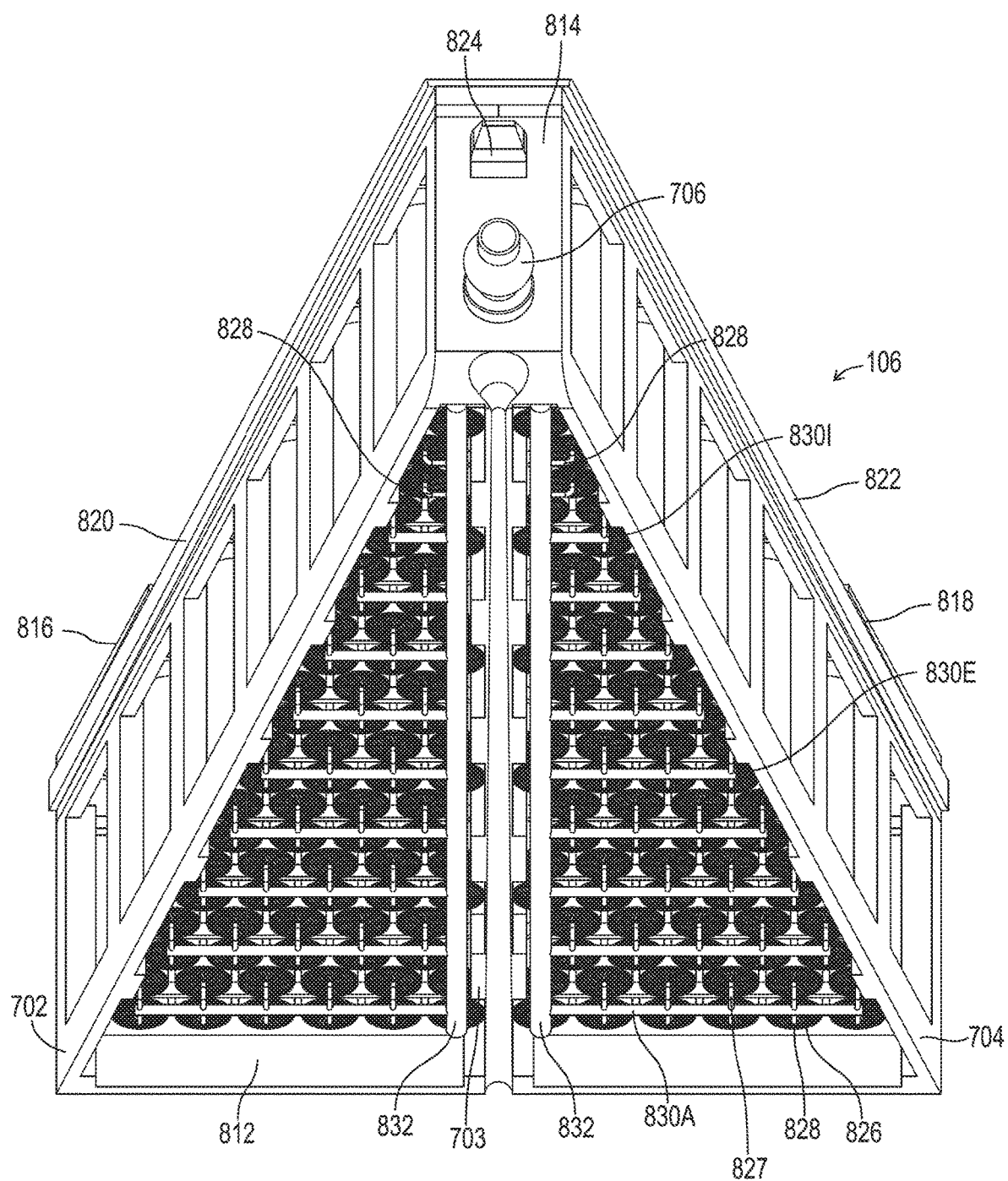
Figure 8E:
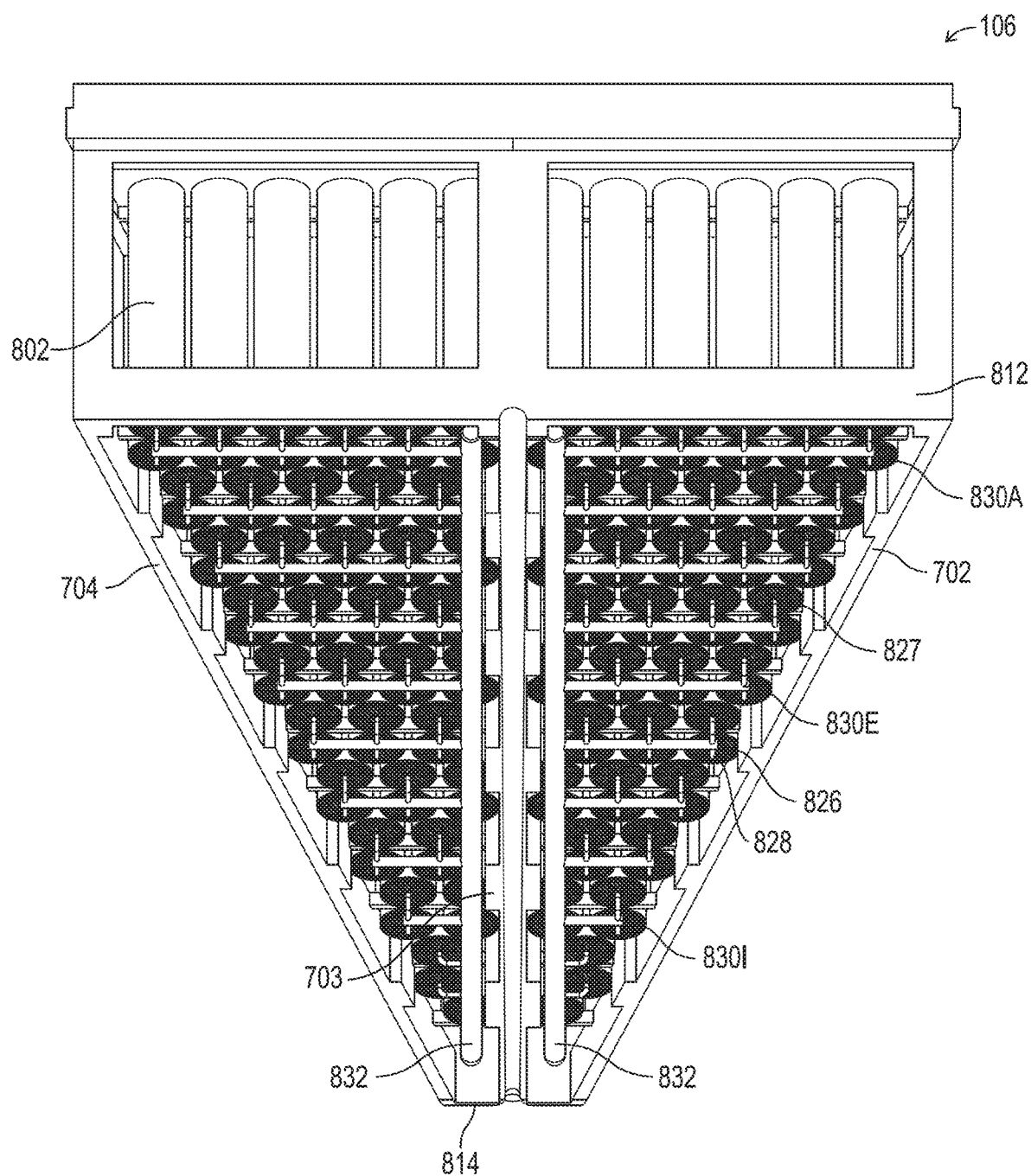
Figure 8F:
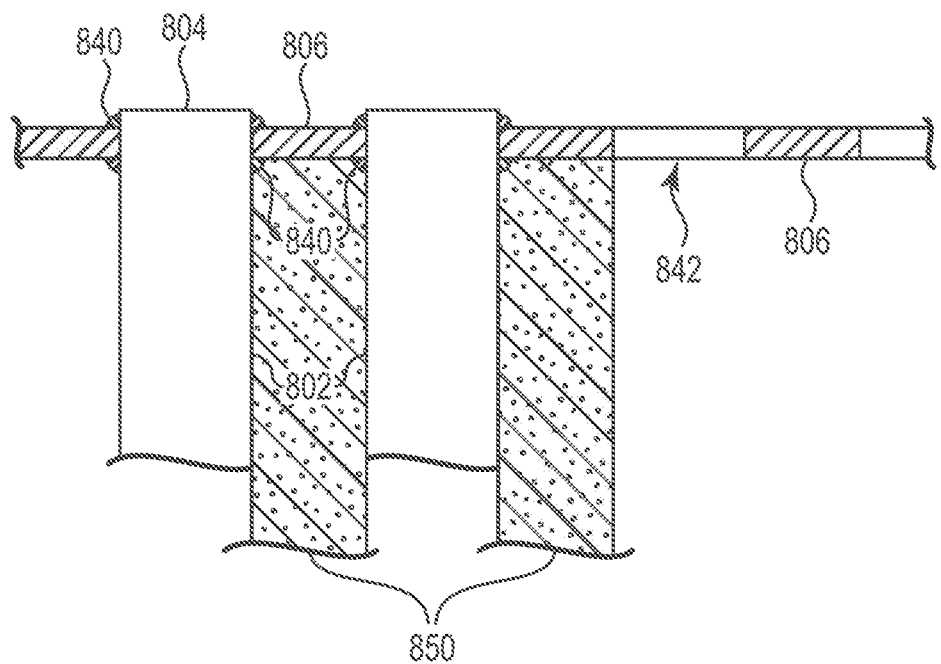
FIGS. 8F and 8G are cross-sectional views showing the use of an adhesive to bond and seal water separation cartridges in a water separation membrane module.
Figure 8G:
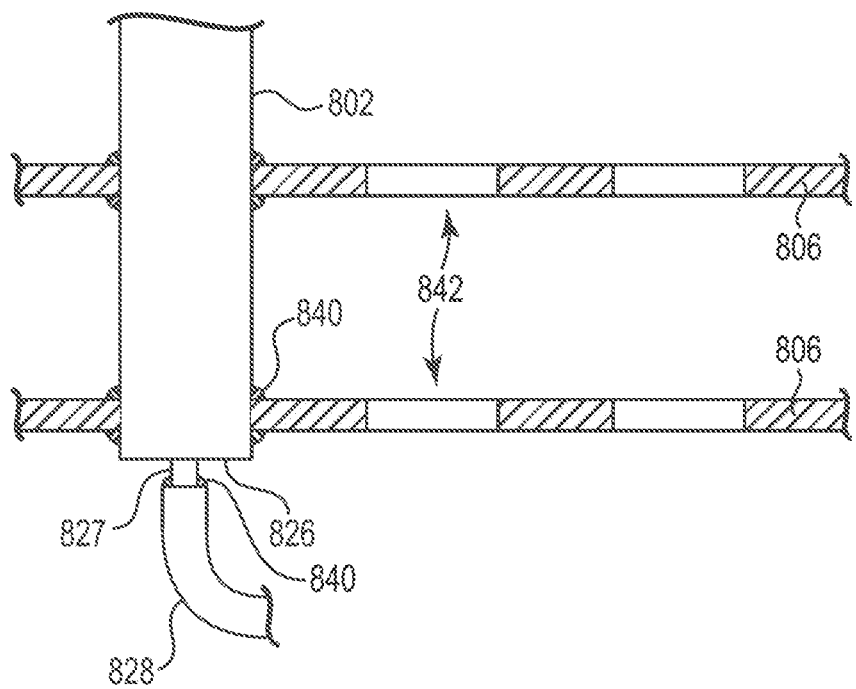

FIG. 8C, FIG. 8D and FIG. 8E are perspective underside views of a module 106. The circular salinated water inlets 826 at the lower end of each cartridge 802 permit the entry of salinated water into the cartridges 802. Desalinated product water exits a typically centrally-located outlet 827 in each cartridge 802 via cartridge manifolds 828, branch manifolds 830A through 830I (for the nine depicted rows in the disclosed cartridge array that contain two or more cartridges each side of the array centerline) and a pair of radially-extending product water collection manifolds 832 located each side of the array centerline. Three single cartridges 802 located on each side of the array centerline near inner end plate 814 are directly connected by individual cartridge manifolds 828 to product water collection manifolds 832.

The prefilter screens 104 shown in FIG. 7C, sides 702, 704, 812 and 814 and the underside of perforated divider plate 806 cooperate to isolate the filtered water passing through prefilter screens 104 from the salinated water surrounding module 100 and ensure that the interior portion of module 106 surrounding the cartridges 802 will contain only filtered water that has passed through a screen 104.

In the embodiment depicted in FIG. 7A through FIG. 8E, the modules 106 have an approximately wedge-shaped or trapezoidal-shaped cross-section, with sides 702 and 704 that taper or converge towards permeate collector 112 and the vertical central axis of the disclosed SRO apparatus. The disclosed modules may be any desired size, and in a preferred embodiment may for example be about 5 to 8 meters long by about 4 to 5 m wide by about 0.5 to 1.5 m thick, and have shapes and dimensions that facilitate efficient packing of the modules in standard shipping containers as discussed in more detail below. The disclosed modules preferably have neutral buoyancy at the intended operating depth.

Figure 9:
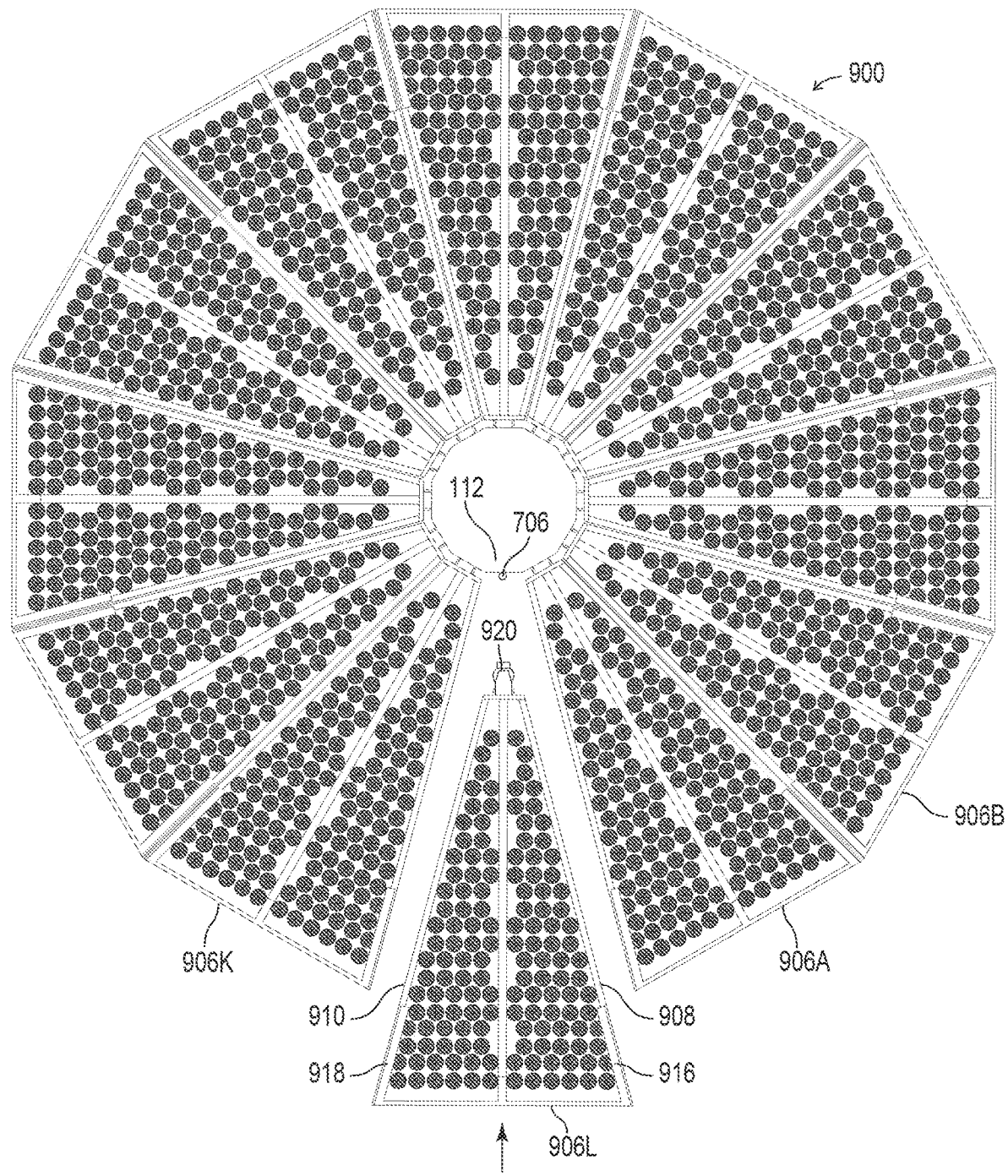
FIG. 9 is a top plan view of a generally polygonal array of the disclosed modules showing a module in an unattached condition.

In the embodiment depicted in FIG. 9, twelve modules are shown, and in their assembled form the depicted modules provide an array with a dodecagonal perimeter in plan view. Other module shapes, numbers of modules (e.g., 3, 4, 5, 6, 7, 8, 9, 10, 11, 13, 14, 15 or 16) and array shapes (e.g., triangular, square, pentagonal, hexagonal, hexadecagonal, and other polygons made from the numbers of modules mentioned above, as well as circular or other curved shapes) can be employed if desired.

As illustrated in FIG. 9, maintenance of an array 900 containing a defective, outdated or otherwise ineffective module may be performed by withdrawing such module from the array, thereby leaving a gap formerly occupied by the withdrawn module, and replacing the withdrawn module with a new or rebuilt module 906L. Because such replacement will be carried out while the SRO apparatus is submerged, it is desirable that both the module removal and module replacement procedures proceed quickly and efficiently, with minimal disruption in product water output despite potential adverse conditions such as low visibility, underwater currents or difficulties in operating an ROV or other devices that might be used to carry out or assist in module replacement. Module maintenance may for example be scheduled or performed based on signals from one or more sensors that monitor the flow rate or salinity of product water, concentrate or brine flowing through the apparatus, or the flow of water into the apparatus. Such sensors may monitor individual cartridges, individual modules or an entire array. Module maintenance may in addition or instead be based on a preset or adjustable schedule, predictive algorithms, the availability of improved RO membranes or cartridges, and other measures that will be apparent to persons having ordinary skill in the art upon reading this disclosure.

Removal of defective or ineffective modules can be facilitated while continuing to operate the remainder of the disclosed apparatus during module removal, and relying on the portion of the disclosed hot-swap valve 706 that remains connected to permeate collector 112 to close and seal off permeate collector 112 from the surrounding salinated water. Such valve closure may be initiated in a variety of ways, including in response to a suitable electrical command, mechanical switch, or in response to the outward motion of a module 106 away from permeate collector 112 and separation components in hot-swap valve 706. Hot-swap valve 706 accordingly desirably prevents the entry of salinated water into permeate collector 112 during module replacement. The portion of hot-swap valve 706 remaining on the removed module 106 may optionally also be closed upon removal in order to prevent entry of desalinated water into the product water outlet side of the removed module 106. However, doing so generally will not be needed, as the removed module 106 will normally be brought to the surface and flushed with fresh water as a part of a repair or rebuilding procedure.

Removal of a module 106 may cause unfiltered salinated water to enter the otherwise normally isolated chamber between the prefilters 104 and the modules 106 in the disclosed array 700. Typically however such unfiltered water entry would take place for a relatively brief time period, until such time as a replacement module or temporary blanking plate can be inserted into the array, and consequently will be unlikely to introduce significant detrimental quantities of debris or other solid matter into such chamber.

During insertion of replacement module 906L, converging sides 908 and 910 and hangers 916 and 918 assist in underwater docking and attachment of module 906L to array 900 by helping to align and guide module 906L into proper orientation and location in the three-dimensional volume between adjacent modules 906A and 906K, and by helping to align and guide hot-swap valve body 920 into proper alignment and engagement with the portion of valve body 706 that remains attached to permeate collector 112. Hangers 916 and 918 preferably have inwardly-pointing tapered ends (viz., ends that point towards the longitudinal central axis of the disclosed array and have a wedge-shaped profile in plan view, side view or both plan and side views). Such tapered ends will significantly assist in docking module 906L into the disclosed SRO apparatus. During insertion of module 906L into array 900, hangers 916 and 918 enter the slotted receiving aperture 718 shown in FIG. 7B, and rails like the rails 820 and 822 shown in FIG. 8A and FIG. 8B engage with the radial rails 714 shown in FIG. 7B. Upon reattachment of replacement module 906, the hot-swap valve formed by valve bodies 706 and 920 can then open to permit resumption of product water collection from the affected portion of the disclosed array. Such valve opening may be initiated in a variety of ways, including in response to a suitable electrical command, mechanical switch, physical manipulation by an ROV, or in response to the inward motion of module 906L and joinder of valve bodies 706 and 920. In this fashion, removal and inspection or replacement of individual modules 106 can be accomplished without having to shut down the disclosed SRO apparatus, thereby enabling continued production of product water and concentrate or brine from the remaining undisturbed modules 106.

In addition to the disclosed tapered sides, rails and hangers, the disclosed module reattachment procedure may be assisted by employing other guidance features or devices. Exemplary such other features or devices will be apparent to persons having ordinary skill in the desalination art upon reading this disclosure, and include appropriately-shaped (e.g., conical or tapered) mating or receiving surfaces, snubbers, guiderails or magnets on the sidewalls of the replacement module or adjacent modules, the upper or lower surfaces of the replacement module, adjacent portions of the framework receiving the replacement modules, or the hot-swap valve bodies 920. Such other guidance features or devices may for example contact the replacement module or adjacent modules during any or all of the start, middle, or end of the disclosed replacement procedure. If desired, one or more gaskets may also be employed on the modules 106, hood 118 or assembly of prefilters 104 to assist in sealing gaps between the modules 106 and the remainder of the disclosed SRO apparatus, and in some embodiments such gaskets may provide guidance features to assist during module insertion.

Having thus described preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

The invention claimed is:

1. A submersible water separation membrane module comprising:
   a plurality of water separation membrane cartridges, each cartridge having:
   i) a water separation membrane,
   ii) an impermeable cartridge wall surrounding the membrane,
   iii) a first cartridge end sealed to the wall and through which pressurized salinated water flows into the cartridge and is separated by the membrane into concentrate or brine and at least partially desalinated water,
   iv) a second cartridge end from which the concentrate or brine exits the cartridge, and
   v) a product water collection tube that collects from inside the cartridge the at least partially desalinated product water passing through the membrane, and through which the at least partially desalinated water exits the cartridge;
   a generally parallel array of the cartridges being mounted in a perforated divider plate whose perforations surround the cartridge walls or the first or second cartridge ends of the plurality of water separation membrane cartridges, the divider plate separating salinated water flowing into the first cartridge ends from concentrate or brine exiting the cartridges; and
   a product water collection manifold in fluid engagement with a plurality of the product water collection tubes and into which the at least partially desalinated water flows;
wherein a) the manifold is adhesively bonded to the plurality of the product water collection tubes, or b) the divider plate is adhesively bonded to a plurality of the cartridge walls or ends, or both a) and b).

2. The module according to claim 1, wherein the water separation membranes of the plurality of water separation membrane cartridges are reverse osmosis membranes.

3. The module according to claim 1, wherein the product water collection tubes in the array are adhesively bonded to the product water collection manifold.

4. The module according to claim 1, wherein the divider plate is adhesively bonded to a plurality of the cartridge walls or ends.

5. The module according to claim 1, wherein the divider plate is adhesively bonded to a plurality of the cartridge walls.

6. The module according to claim 1, wherein the product water collection tubes are generally centrally located in the cartridges.

7. The module according to claim 1, wherein the cartridges have generally cylindrical shapes.

8. The module according to claim 1, wherein the divider plate has a generally polygonal perimeter.

9. The module according to claim 1, wherein the divider plate has a generally trapezoidal perimeter.

10. The module according to claim 1, wherein the divider plate has a generally triangular perimeter.

11. The module according to claim 1, wherein the divider plate has a generally circular perimeter.

12. The module according to claim 1, wherein the divider plate comprises corrosion-resistant metal.

13. The module according to claim 1, wherein the divider plate comprises a fiber-reinforced polymer or filled composite.

14. The module according to claim 1, wherein the product water collection tubes or manifold are surface-treated to improve adhesion of the manifold to the collection tubes.

15. The module according to claim 1, wherein the divider plate is surface-treated to improve adhesion of the divider plate to the cartridge walls or ends.

16. The module according to claim 1, further comprising a plurality of O-rings between the product water collection tubes and manifold.

17. The module according to claim 1, further comprising a plurality of O-rings or gaskets between the divider plate and cartridges.

18. The module according to claim 1, further comprising a buoyant medium between the cartridges, the buoyant medium having a density less than that of seawater and imparting increased buoyancy to the array when the array is submerged in seawater.

19. The module according to claim 18, wherein the buoyant medium imparts neutral buoyancy to the array when the array is submerged in seawater at an intended operating depth.

20. The module according to claim 18, wherein the buoyant medium comprises engineered syntactic foam.

21. The module according to claim 18, wherein an adhesive of the adhesive bonds comprises the buoyant medium.

22. The module according to claim 1, wherein an adhesive of the adhesive bonds comprises an epoxy resin.

23. The module according to claim 1, wherein an adhesive of the adhesive bonds is substantially free of bisphenol A, bisphenol F and their diglycidyl ethers.

24. The module according to claim 1, wherein an adhesive of the adhesive bonds comprises a polyurethane, polyester, acrylic or fluorinated resin.

25. The module according to claim 1, wherein an adhesive of the adhesive bonds comprises a silicone resin.

26. The module according to claim 1, wherein the cartridges are not encased in a pressure vessel.

27. A method for assembling a submersible water desalination apparatus, the method comprising the steps of:
  a. providing a plurality of water separation membrane cartridges, each cartridge having:
    i) a water separation membrane,
    ii) an impermeable cartridge wall surrounding the membrane,
    iii) a first cartridge end sealed to the wall and through which pressurized salinated water flows into the cartridge and is separated by the membrane into concentrate or brine and at least partially desalinated water,
    iv) a second cartridge end from which the concentrate or brine exits the cartridge, and
    v) a product water collection tube that collects from inside the cartridge the at least partially desalinated product water passing through the membrane, and through which the at least partially desalinated water exits the cartridge;
  b. mounting a generally parallel array of the cartridges in a perforated divider plate whose perforations surround the cartridge walls or the first or second cartridge ends of the plurality of water separation membrane cartridges, the divider plate separating salinated water flowing into the first cartridge ends from concentrate or brine exiting the cartridges; and
  c. fastening a product water collection manifold in fluid engagement with a plurality of the product water collection tubes;
wherein a) the manifold is adhesively bonded to the plurality of the product water collection tubes, b) the divider plate is adhesively bonded to a plurality of the cartridge walls or ends, or both a) and b).

28. The method according to claim 27, further comprising debonding an adhesive of the adhesive bonds, removing and replacing at least one cartridge, and adhesively bonding the manifold to the collection tube of the replacement cartridge or adhesively bonding the divider plate to such replacement cartridge.

29. The method according to claim 28, comprising chemically, sonically or electrically debonding the adhesive.

30. The method according to claim 28, comprising cryogenically or thermally debonding the adhesive.

* * * * *